United States Patent [19]
Tekemori et al.

[11] Patent Number: 5,361,131
[45] Date of Patent: Nov. 1, 1994

[54] OPTICAL DISPLACEMENT MEASURING APPARATUS UTILIZING FOURIER TRANSFORM METHOD

[75] Inventors: Tamiki Tekemori; Yuji Kobayashi, both of Hamamatsu, Japan

[73] Assignee: Hamamatsu Photonics K.K., Shizuoka, Japan

[21] Appl. No.: 928,303

[22] Filed: Aug. 12, 1992

[30] Foreign Application Priority Data

Aug. 12, 1991 [JP] Japan .................... 3-226459

[51] Int. Cl.⁵ .............................................. G01B 9/02
[52] U.S. Cl. ..................................... 356/355; 356/357
[58] Field of Search ............... 356/345, 355, 356, 357, 356/358, 359

[56] References Cited

FOREIGN PATENT DOCUMENTS

| | | |
|---|---|---|
| 0307668 | 3/1989 | European Pat. Off. . |
| 57-187605 | 11/1982 | Japan . |
| 59-212773 | 12/1984 | Japan . |
| 3175303 | 7/1991 | Japan . |
| 9013036 | 11/1990 | WIPO . |

OTHER PUBLICATIONS

Optics Letters vol. 15, No. 5, Mar. 1, 1990, pp. 285–287, "Bistable Spatial Light Modulator Using a Ferroelectric Liquid Crystal" Fukushima et al.

Optics Communications, vol. 78, No. 5/6, Sep. 15, 1990, pp. 322–326, "Real-Time Optical Joint Transform Correlator For Velocity Measurement Using Clipped Speckle Intensity", Ogiwara et al.

"Application of LCTV to nonlinear speckle correlator", Akifumi Ogiwara, Optics Communications, vol. 86, No. 6, Dec. 15, 1991, pp. 513–522.

"Measurement of Surface Displacement by Speckle Image Technique—Quasi Real-Time Measurement Utilizing a Liquid Crystal Display" (Electronics Information and Communication Society Papers C-I vol J73-C-I No. 3, pp. 128–133, Mar., 1990 (Abstract).

"Joint Transformation type Speckle Pattern Correlation Detector with using non-linear detector" Optics vo. 20-5, May 1991 (Abstract).

"Real-time optical correlator for doubly exposed clipped speckle", Ogiwara, et al., Optics Communications, vol. 78, No. 3, 4, Sep. 1, 1990, pp. 213–216.

*Primary Examiner*—Samuel A. Turner
*Assistant Examiner*—Robert Kim
*Attorney, Agent, or Firm*—Sughrue, Mion, Zinn, Macpeak & Seas

[57] ABSTRACT

An optical displacement measuring apparatus of the present invention optically measures a displacement amount of an object. The apparatus includes: image forming means for forming an image indicative of the displacement amount of the object achieved between first and second timings; first modulating means for modulating coherent light in accordance with the image; first Fourier transform means for subjecting the coherent light modulated by said first modulating means to Fourier transformation to thereby form a first Fourier image; second modulating means for modulating coherent light in accordance with the first Fourier image; second Fourier transform means for subjecting the coherent light modulated by said second modulating means to Fourier transformation to thereby form a second Fourier image; detecting means for detecting peak position of the second Fourier image indicative of the displacement amount of the object between the first and second timings; and time interval adjusting means for adjusting a time interval defined between the first and second timings.

35 Claims, 10 Drawing Sheets

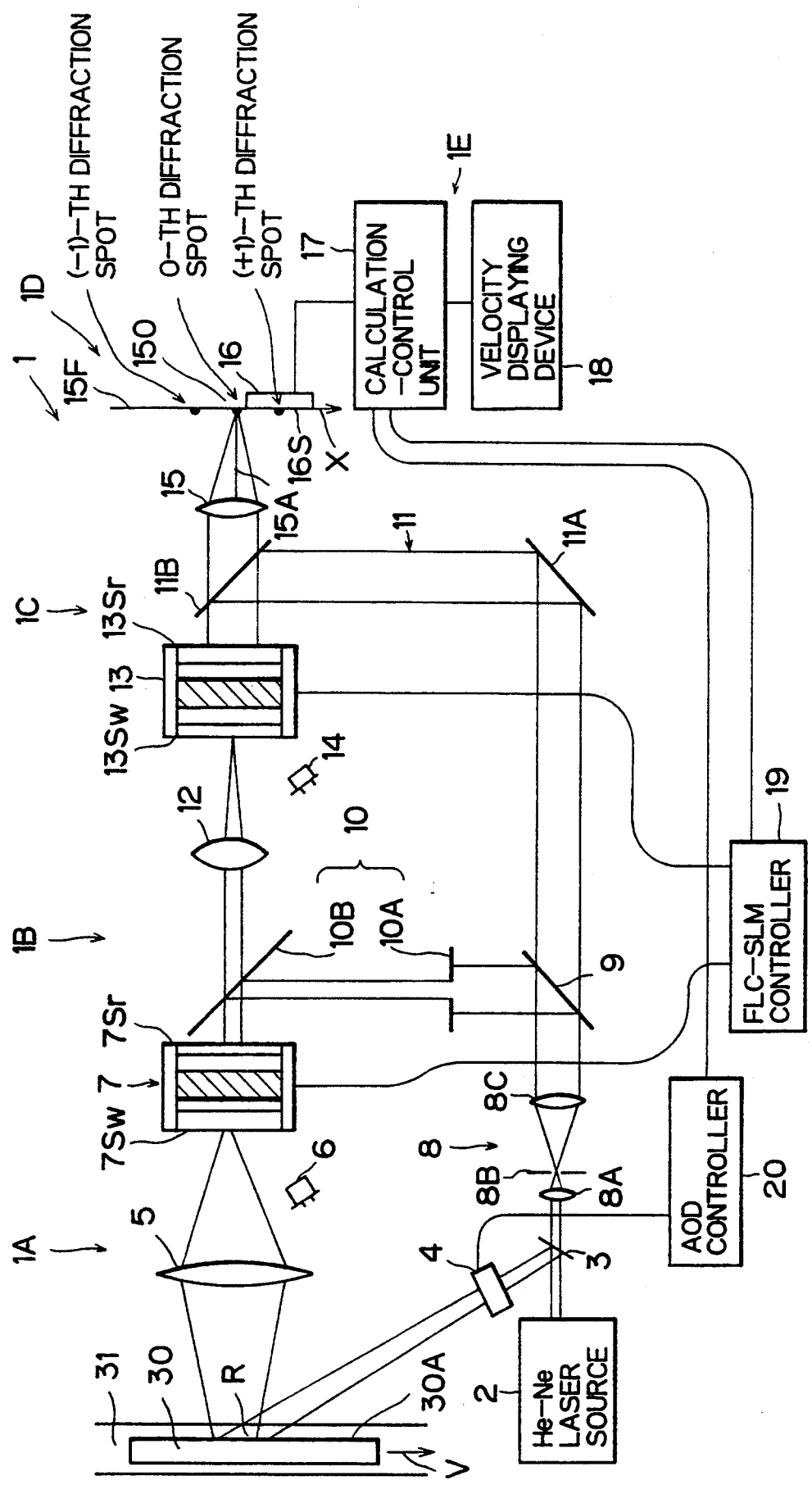

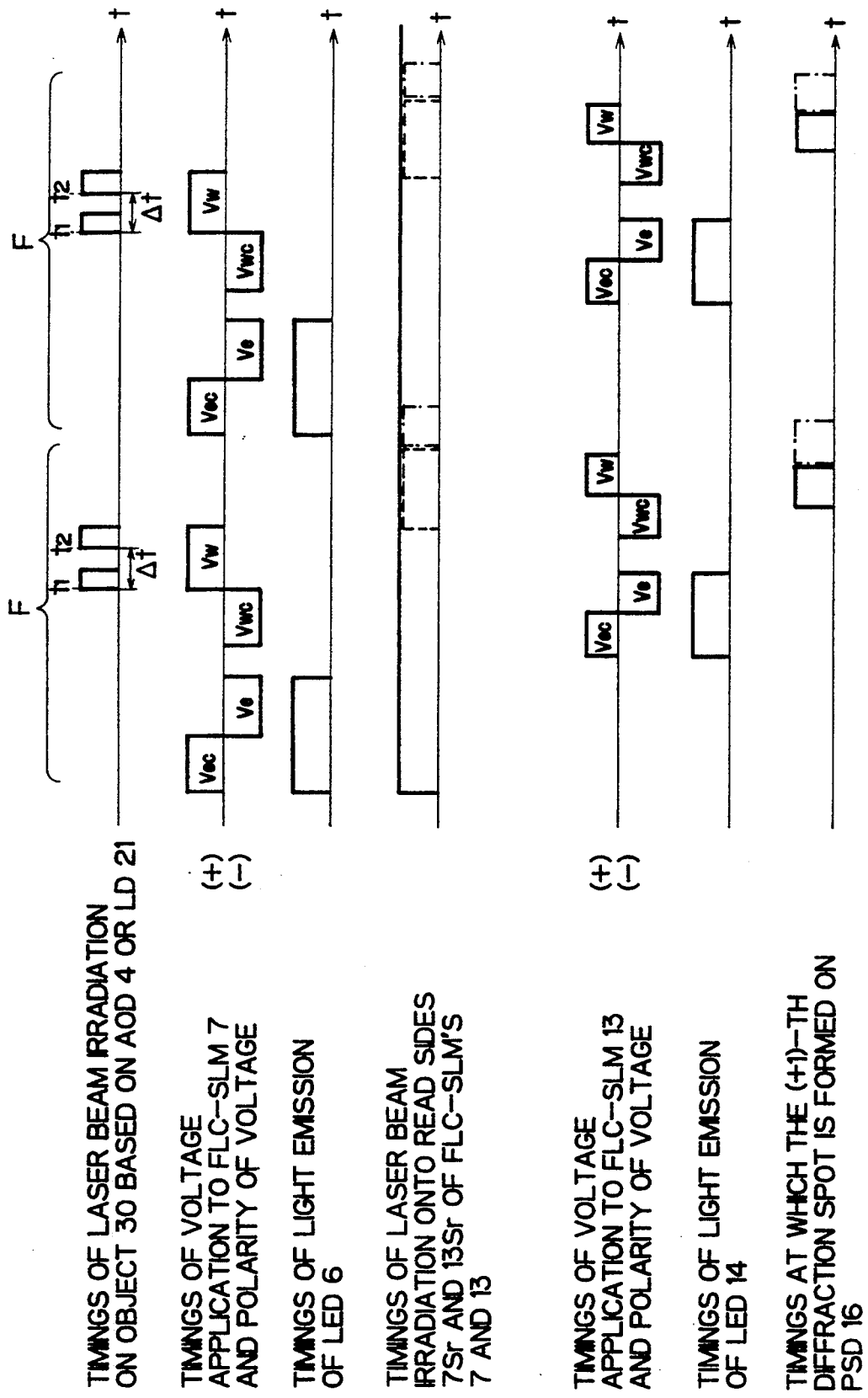

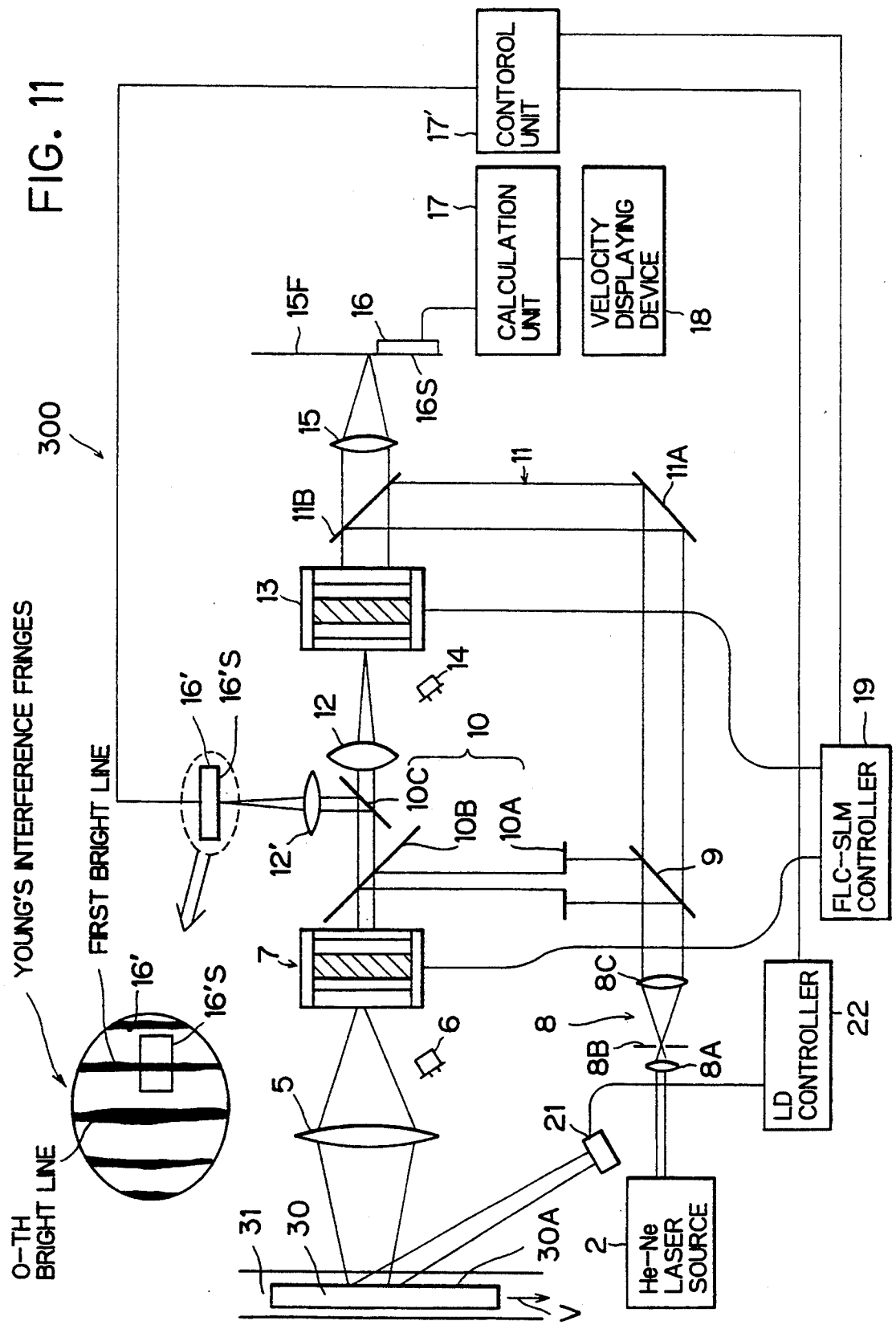

OPTICAL DISPLACEMENT MEASURING APPARATUS UTILIZING FOURIER TRANSFORM METHOD

BACKGROUND OF THE INVENTION

1. Field of the Invention

The present invention relates to an optical displacement measuring apparatus for optically measuring a state, an amount, or a speed of displacement of an object. In this description, the word "a state, an amount or a speed of a displacement" is intended not only to mean a moving state, a moving amount and a moving speed of a moving object, but also to mean a changing state, a changing amount and a changing speed of an object which is being deformed or is being changed in its shape or figure.

2. Description of Related Art

There has been conventionally proposed a speckle image technique for optically measuring a displacement amount of a moving object.

Japanese Unexamined Patent Application Publication No. 59-212773 discloses an optical velocity measuring apparatus applying the speckle image technique. In the optical velocity measuring apparatus, a moving object is illuminated with laser beam at two timings (first and second timings), so that a speckle pattern is formed at each of the two timings. (The speckle pattern formed at the first timing will be referred to as a "first speckle pattern", and the speckle pattern formed at the second timing will be referred to as a "second speckle pattern", hereinafter.) The first and second speckle patterns have such a relationship that the speckles constituting the second speckle patterns are distributed in the same manner as the speckles constituting the first speckle pattern, but the speckles of the second speckle pattern are shifted as a whole from the speckles of the first speckle pattern, since the object is moved between the two timings. More specifically to say, each of the speckles of the second speckle pattern is shifted from a corresponding one of the speckles of the first speckle pattern, with a shift amount being determined based on the displacement amount of the object attained between the two timings.

In the optical velocity measuring apparatus, each of the first and second speckle patterns is detected by a plurality of optical detecting elements. A correlation (shift amount) between the first and second speckle patterns is calculated, while shifting the detected results for the first speckle pattern relative to those for the second speckle pattern. Based on the thus obtained correlation (shift amount) between the first and second speckle patterns, the displacement amount of the object attained between the two timings and the velocity of the object are calculated.

In the above-described conventional optical velocity measuring apparatus, however, a lot of time is required to detect each of the first and second speckle patterns with the plural optical detecting elements and to calculate the correlation between the first and second speckle patterns. In other words, the velocity measuring operation of the conventional apparatus is complicated and therefore requires a lot of time. Accordingly, the conventional optical velocity measuring apparatus fails to realize a real-time velocity detecting operation. In addition, since the velocity measuring operation requires a lot of time, the conventional velocity measuring apparatus fails to detect changes in the velocity of the object with a short time interval.

SUMMARY OF THE INVENTION

The present invention is directed to eliminating the above-described defects of the conventional optical velocity measuring apparatus. An object of the present invention is therefore to provide an optical displacement measuring apparatus for realizing a real-time measurement. Another object of the present invention is to provide an optical measuring apparatus which is capable of measuring changes in the velocity of the object with a short time interval.

In order to attain the above-described objects, the present invention provides an optical displacement measuring apparatus for optically measuring a displacement amount of an object, comprising: image forming means for forming an image indicative of the displacement amount of the object achieved between first and second timings; first modulating means for modulating coherent light in accordance with the image; first Fourier transform means for subjecting the coherent light modulated by said first modulating means to Fourier transformation to thereby form a first Fourier image; second modulating means for modulating coherent light in accordance with the first Fourier image; second Fourier transform means for subjecting the coherent light modulated by said second modulating means to Fourier transformation to thereby form a second Fourier image; detecting means for detecting peak position of the second Fourier image indicative of the displacement amount of the object between the first and second timings; and time interval adjusting means for adjusting a time interval defined between the first and second timings.

The image forming means preferably irradiates light onto the object at the first and second timings, to thereby form a first image of the object at the first timing and form a second image of the object at the second timing, the positional relationship between the first and second images representing the displacement amount of the object.

More preferably, the image forming means irradiates coherent light onto the object at the first and second timings, to thereby form a first speckle pattern of the object at the first timing and form a second speckle pattern of the object at the second timing, the positional relationship between the first and second speckle patterns representing the displacement amount of the object.

The image forming means may preferably continuously irradiate light onto the object to thereby continue forming the image of the object. In this case, the first modulating means includes a spatial light modulator for recording the image of the object only at the first and second timings, to thereby record therein a first image of the object at the first timing and a second image of the object at the second timing and spatially modulate the coherent light in accordance with the first and second images recorded therein, the positional relationship between the first and second images representing the displacement amount of the object.

More specifically, the image forming means continuously irradiates coherent light onto the object to thereby continue forming a speckle pattern of the object. In this case, the first modulating means includes a spatial light modulator for recording the speckle pattern of the object only at the first and second timings, to thereby record therein a first speckle pattern of the object at the first timing and a second speckle pattern of the object at the second timing and spatially modulate the coherent light in accordance with the first and second speckle patterns recorded therein, the positional relationship between the first and second speckle patterns representing the displacement amount of the object.

The time interval adjusting means controls the image forming means to irradiate the object with the light with a desired time interval.

The first modulating means preferably includes a ferroelectric liquid crystal spatial light modulator for recording both the first and second images (speckle patterns) of the object and for spatially modulating the coherent light in accordance with the first and second images (speckle patterns) recorded therein.

In the apparatus of the present invention, the first Fourier transform means forms, as the first Fourier image, an image of Young's interference fringes indicative of the positional relationship between the first and second images. The second Fourier transform means forms, as the second Fourier image, an image of autocorrelation signal spot image indicative of the positional relationship between the first and second images.

The detecting means preferably includes a position sensitive light detector. In this case, the time interval adjusting means controls the image forming means to irradiate the object with the light with such a time interval as allowing the autocorrelation signal spot image to be formed on a detecting area of the position sensitive light detector.

According to another aspect, the present invention provides an optical displacement measuring apparatus for optically measuring a relative displacement amount of an object relative to the optical displacement measuring apparatus, comprising: image forming means for forming an optical image indicative of the relative displacement amount of the object with respect to the optical displacement measuring apparatus achieved between first and second timings; first recording means for recording the optical image; first read-out means for reading out the optical image with coherent light; first Fourier transform means for subjecting the optical image to Fourier transformation to thereby form a first Fourier optical image; second recording means for recording the first Fourier optical image; second read-out means for reading out the first Fourier optical image with coherent light; second Fourier transform means for subjecting the first Fourier optical image to Fourier transformation to thereby form a second Fourier optical image; detecting means for detecting intensity peak position of the second Fourier optical image indicative of the relative displacement amount of the object between the first and second timings; and time interval adjusting means for adjusting a time interval defined between the first and second timings.

According to further aspect, the present invention provides an optical displacement measuring apparatus for optically measuring a relative displacement state of an object relative to the optical displacement measuring apparatus, comprising: image forming means for forming an optical image indicative of the relative displacement state of the object with respect to the optical displacement measuring apparatus achieved between first and second timings; first recording means for recording the optical image; first read-out means for reading out the optical image with coherent light; first Fourier transform means for subjecting the optical image to Fourier transformation to thereby form a first Fourier optical image; second recording means for recording the first Fourier optical image; second read-out means for reading out the first Fourier optical image with coherent light; second Fourier transform means for subjecting the first Fourier optical image to Fourier transformation to thereby form a second Fourier optical image; detecting means for detecting intensity peak position of the second Fourier optical image indicative of the relative displacement state of the object between the first and second timings; and time interval adjusting means for adjusting a time interval defined between the first and second timings.

Other objects, features and advantages of the present invention will become apparent in the following specification and accompanying drawings.

BRIEF DESCRIPTION OF THE DRAWINGS

FIG. 1 is a schematic plan view of an optical system of an optical displacement measuring apparatus of a first preferred embodiment of the present invention;

FIG. 2(b) is a plan view showing the lens 15 and the PSD 16;

FIG. 5 is a timing chart of the autocorrelation signal spot forming operations F conducted in the optical displacement measuring apparatus of the first and second preferred embodiments of the present invention;

FIG. 11 is a schematic plan view of an optical system of an optical displacement measuring apparatus of a modification of the present invention.

DETAILED DESCRIPTION OF PREFERRED EMBODIMENTS

Figure 2A:
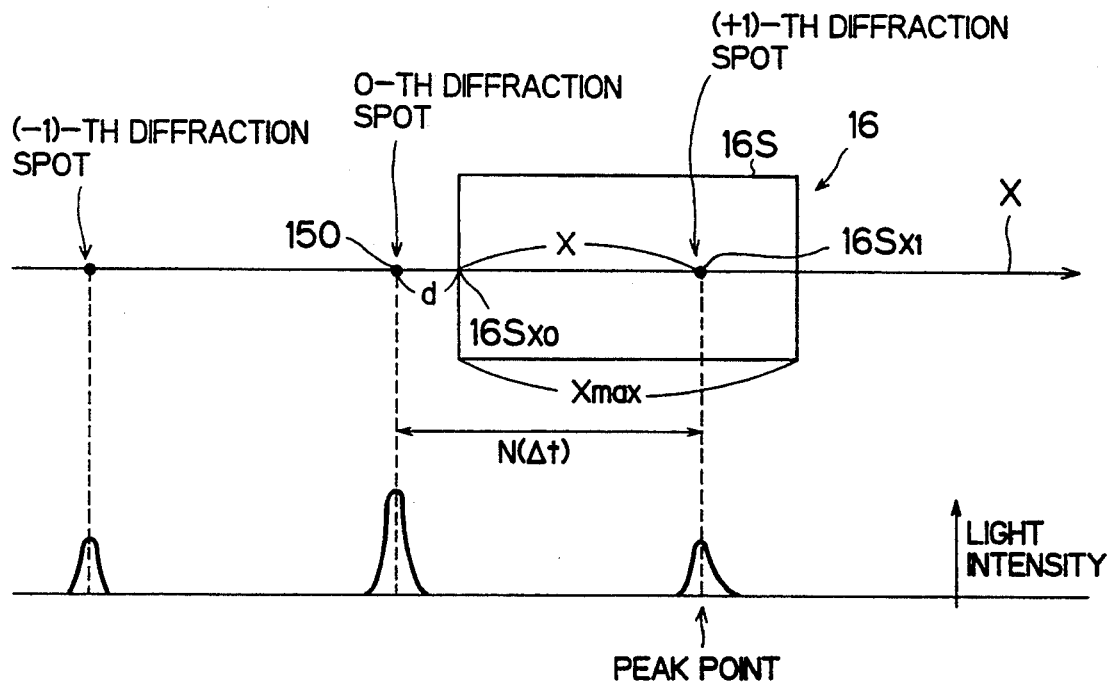
FIG. 2(a) and 2(b) schematically show the state how the 0-th and ($\pm 1$)-th diffraction spot images are formed on the focal plane 15F of the lens 15, in which FIG. 2(a) schematically shows a front side view of the PSD 16 viewed from the lens 15 in FIG. 1 for showing how the (+1)-th diffraction spot is formed on the beam spot receiving area 16S of the PSD 16 and for showing the light intensities of the 0-th and ($\pm 1$)-th diffraction spot images.

FIG. 1 illustrates a schematic plan view of an optical system of an optical displacement measuring apparatus 1 of a first preferred embodiment of the present invention.

The optical displacement measuring apparatus 1 includes: a He—Ne laser source 2 for emitting laser light; a speckle pattern forming part 1A for radiating the laser light onto a surface of an object 30 at first and second timings with a predetermined time interval therebetween, to thereby obtain first and second speckle patterns, positional relationship between the first and second speckle patterns representing the displacement amount of the object 30 attained between the first and second timings; a first ferroelectric liquid crystal spatial light modulator (which will be referred to as "FLC-SLM", hereinafter) 7 for recording therein the thus formed first and second speckle patterns; a Young's interference fringes forming part 1B for allowing the first FLC-SLM 7 to spatially modulate the laser beam emitted from the He—Ne laser source 2 with the first and second speckle patterns recorded therein and for allowing a first Fourier transformation lens 12 to subject the modulated laser beam to a spatial Fourier transformation, to thereby form an image of Young's interference fringes indicative of the positional relationship between the first and second speckle patterns; a second FLC-SLM 13 for recording therein the thus formed image of Young's interference fringes; an autocorrelation signal spot image forming part 1C for allowing the second FLC-SLM 13 to spatially modulate the laser beam emitted from the He—Ne laser source 2 in accordance with the image of Young's interference fringes recorded therein and for allowing a second Fourier transformation lens 15 to subject the thus modulated laser beam to a spatial Fourier transformation, to thereby form an autocorrelation signal spot image at such a position as indicative of the positional relationship between the first and second speckle patterns; detecting part 1D for detecting the position of the autocorrelation signal spot image; a calculation-control part 1E for calculating, based on the detected result of the detecting part 1D, the displacement amount of the object 30 attained between the first and second timings and for controlling the speckle image forming part 1A, the first FLC-SLM 7, the Young's interference fringes forming part 1B, the second FLC-SLM 13, the autocorrelation signal spot forming part 1C and the detecting part 1D to thereby perform the displacement measuring operation.

More specifically to say, the object 30 is irradiated with the laser light, at the first and second timings. The first and second speckle patterns are obtained at the first and second timings, respectively. The speckles constituting the second speckle pattern are distributed in the same manner as the speckles constituting the first speckle pattern, but are shifted as a whole from the speckles constituting the first speckle pattern with a distance corresponding to the distance with which the object 30 is moved between the first and second timings.

In the displacement measuring apparatus 1, therefore, the first and second speckle patterns in which the speckles are distributed in the same manner but are shifted as a whole from each other are processed through the first FLC-SLM 7, the Young's interference fringes forming part 1B, the second FLC-SLM 13 and the autocorrelation signal spot image forming part 1C, so that the first and second speckle patterns thus having the same patterns with each other are subjected to such a processing as similar to a joint transfer correlation (JTC) processing. As a result, there is obtained the autocorrelation signal spot image for the first and second speckle patterns which have the same patterns with each other. The autocorrelation signal spot image is formed, at such a position as indicative of the shift amount between the first and second speckle patterns. Since the shift amount between the first and second speckle patterns represents the displacement amount of the object 30, it is possible to calculate the displacement amount of the object 30, through detecting the position of the autocorrelation signal spot image.

The displacement measuring apparatus 1 of the present invention will be described in greater detail, hereinafter.

The object 30 of a rectangular parallelpiped shape is conveyed on a conveying path of a conveying device 31 such as a belt conveyor. The conveying path extends in a direction indicated by an arrow V of FIG. 1 which therefore extends along the plane of the sheet of the drawing of FIG. 1. The object 30 has a rough surface 30A which extends perpendicularly to the plane of the sheet of drawing of FIG. 1 and which serves as a diffuse surface for reflecting and diffusing the laser beam irradiated thereon to form the speckle pattern.

The He—Ne laser source 2 continuously emits a linearly-polarized laser beam. The laser beam emitted from the laser source 2 is a parallel laser beam.

In the speckle pattern forming part 1A, a half mirror 3 reflects a part of the laser beam emitted from the laser source 2 to introduce it to an acoustooptic deflector (which will be referred to as an "AOD", hereinafter) 4. The AOD 4 is controlled by an AOD controller 20 to deflect the laser beam thus introduced thereto. More specifically to say, the AOD 4 is controlled to deflect the laser beam so that the laser beam may be directed in a predetermined direction at two times with a predetermined time interval being formed therebetween. In other words, the AOD 4 serves to selectively introduce two laser beam pulses onto a fixed region R of the conveying path of the conveying device 31, at the two timings. Since the object 30 is conveyed along the conveying path, the two laser beams introduced onto the fixed region R are respectively irradiated on the surface 30A of the object 30 at its portions which reach the fixed region R at the two timings, respectively. Accordingly, the two laser beam pulses thus irradiated on the portions of the surface 30A are diffused and reflected therefrom, to form two reflected laser beams.

(The two timings at which the laser beam is thus introduced onto the fixed region R will be referred to as "first and second irradiation timings $t_1$ and $t_2$", hereinafter, The time interval between the two timings will be referred to as an "irradiation time interval $\Delta t = t_1 - t_2$", and the displacement amount of the object 30 attained between the first and second irradiation timings $t_1$ and $t_2$ will be referred to as "a displacement amount $S(\Delta t)$", hereinafter, The two laser beams reflected from the surface 30A of the object 30 will be referred to as "first and second reflected laser beams", hereinafter.)

As apparent from the above, the AOD 4 allows the He—Ne laser beam to be irradiated on the object 30, only at the first and second irradiation timings $t_1$ and $t_2$, to thereby obtain the first and second reflected laser beams.

An imaging lens 5 focuses the first reflected laser beam onto a write side $7S_w$ of the first FLC-SLM 7 so that a speckle pattern (which will be referred to as a "first speckle pattern", hereinafter) is formed on the write side $7S_w$. Similarly, the imaging lens 5 focuses the second reflected laser beam onto the write side $7S_w$ so that a speckle pattern (which will be referred to as a "second speckle pattern", hereinafter) is formed thereon. A plurality of speckles constituting the second speckle pattern thus formed on the write side $7S_w$ and a plurality of speckles constituting the first speckle pattern thus formed on the write side $7S_w$ are distributed in the same manner as each other, but are shifted as a whole from each other. In other words, the speckles of the second speckle pattern are distributed in the same manner as the speckles of the first speckle pattern. The first and second speckle patterns are positioned such that each of the speckles of the second speckle pattern is shifted from a corresponding one of the speckles of the first speckle pattern, in a direction extending parallel to the direction V along which the object 30 is moved. Accordingly, each of the speckles of the second speckle pattern is shifted from a corresponding one of the speckles of the first speckle pattern, in the direction along the plane of the sheet of drawing of FIG. 1. It is further noted that each of the speckles of the second speckle pattern is shifted from a corresponding one of the speckles of the first speckle pattern, with a distance determined basedon on the displacement amount of the object 30 attained between the first and second timings $t_1$ and $t_2$.

More specifically to say, a distance between each one of the speckles constituting the first speckle pattern and a corresponding one of the speckles constituting the second speckle pattern (which will be referred to as a "distance $M(\Delta t)$", hereinafter) is expressed by the following equation (1).

$$M(\Delta t) = m\, S(\Delta t) \tag{1}$$

where m is a value determined in accordance with a magnification value of the imaging lens 5.

The first FLC-SLM 7 is controlled by an FLC-SLM controller 19 to record therein both the first and second speckle patterns thus formed on its write side $7S_w$.

A part of the parallel laser beam which is not reflected at the half mirror 3 passes therethrough and further passes through a beam diameter conversion optical system 8 which consists of a first collimating lens 8A, a spatial filter 8B and a second collimating lens 8C so that the diameter of the laser beam may be converted into such a value as allowing the laser beam to be suitable for being spatially modulated in the second FLC-SLM 13 in accordance with the image of Young's interference fringes recorded therein.

A part of the thus diameter-converted laser beam is then reflected at a half mirror 9, and is introduced onto a read side $7S_r$ of the first FLC-SLM 7 through a first read light introducing path 10 which consists of a diameter-changeable aperture 10A and a half mirror 10B. It is noted that the diameter-changeable aperture 10A further changes the diameter of the laser beam into such a value as allowing the laser beam to be suitable for being spatially modulated in the first FLC-SLM 7 in accordance with the first and second speckle patterns recorded therein.

The laser beam entered in the FLC-SLM 7 from its read side $7S_r$ is then subjected to phase modulation corresponding to the first and second speckle patterns recorded in the FLC-SLM 7. The thus modulated laser beam is outputted from the FLC-SLM 7 through the read side $7S_r$. Thus, the first and second speckle patterns recorded in the FLC-SLM 7 are read out.

The laser beam thus outputted from the FLC-SLM 7 passes through the half-mirror 10B and further passes through a Fourier transform lens 12 where the laser beam is subjected to a spatial Fourier transformation. As a result, an image of Young's interference fringes are formed on a focal plane of the lens 12 at its image field. In other words, the laser beam diffracted in the FLC-SLM 7 at the portions where the first and second speckle patterns are recorded therein is interfered with each other, so that the image of Young's interference fringes is formed. The image of Young's interference fringes therefore corresponds an image obtained through subjecting an intensity distribution of the first and second speckle patterns to a Fourier transformation. An interval between each two adjacent bright lines of the image of Young's interference fringes (which will be referred to as an "interval $K(\Delta t)$", hereinafter) is therefore expressed by the following equation (2).

$$K(\Delta t) = \lambda f_{12}/M(\Delta t) \tag{2}$$

where $f_{12}$ is a focal length of the Fourier transform lens 12 and $\lambda$ is a wavelength of the He—Ne laser beam which is modulated in the FLC-SLM 7 and is subjected to the Fourier transformation.

It is further noted that the direction along which the bright lines of the image of Young's interference fringes are arranged extends parallel to the direction along which the first and second speckle patterns are shifted from each other. Accordingly, the direction along which the bright lines of the image of Young's interference fringes are arranged extends parallel to the direction V along which the object 30 is moved, and therefore extends along the plane of the sheet of drawing of FIG. 1.

The second FLC-SLM 13 is provided at such a position that a write side $13S_w$ thereof is positioned on the focal plane of the Fourier transform lens 12 at its image field. Accordingly, the image of Young's interference fringes is formed on the write side $13S_w$ of the FLC-SLM 13. The FLC-SLM 13 is controlled by the FLC-SLM controller 19 so as to record therein the image of Young's interference fringes.

In the autocorrelation signal spot image forming part 1C, there is provided a second read light introducing path 11 for introducing, onto a read side $13S_r$ of the FLC-SLM 13, a part of the laser beam which is not reflected at the half-mirror 9 but passes therethrough. The second read light introducing path 11 consists of a reflective mirror 11A and a half mirror 11B. The laser beam introduced onto the read side $13S_r$ of the FLC-SLM 13 enters the FLC-SLM 13 where the laser beam is subjected to phase modulation corresponding to the image of Young's interference fringes recorded therein. The laser beam thus modulated in the FLC-SLM is then outputted therefrom through the read side $13S_r$. Thus, the image of Young's interference fringes is read out from the FLC-SLM 13.

The laser beam thus outputted from the FLC-SLM 13 passes through the half mirror 11b and further passes through the Fourier transform lens 15 in which the laser beam is subjected to a spatial Fourier transformation. As a result, a pair of first diffraction spot images (($\pm 1$)-th diffraction spot images) as well as a 0-th diffraction spot image are formed on a focal plane 15F of the Fourier transform lens 15 at its imaging field. The 0-th diffraction spot image is formed on the focal plane at a position (which will be referred to as a "center point 150", hereinafter) where an optical axis 15A of the Fourier transform lens 15 intersects with the focal plane 15F.

The first (($\pm 1$)-th) diffraction spot images serve as the autocorrelation signal spot images obtained through subjecting the first and second speckle patterns having the same speckle patterns with each other to the processing as equivalent to a joint transform correlation processing. Accordingly, the positions at which the first (($\pm 1$)-th) diffraction spot images (autocorrelation signal spot images) are formed represent the autocorrelation (positional relationship) between the first and second speckle patterns which have the same patterns with each other.

More specifically to say, the pair of $\pm 1$-th diffraction spot images are formed to be arranged along a direction which extends parallel to the direction along which the bright lines of the image of Young's interference fringes are arranged. Accordingly, the direction along which the pair of $\pm 1$-th diffraction spot images are arranged extends parallel to the direction V along which the object 30 is moved, and therefore extends along the plane of the sheet of drawing of FIG. 1.

Distances between the 0-th diffraction spot image and each of the $\pm 1$-th diffraction spot images are equal to each other, and have such a value $N(\Delta t)$ as expressed by the following equation (3).

$$N(\Delta t) = \beta_{15}/K(\Delta t) \tag{3}$$

where $\beta_{15}$ is a constant determined dependently both on the wavelength of the He—Ne laser beam which is modulated in the FLC-SLM 13 and is subjected to the Fourier transformation by the Fourier transform lens 15 and on the focal length of the Fourier transform lens 15.

As apparent from the equations (1) through (3), the distance $N(\Delta t)$ between the 0-th diffraction spot image and each of the pair of autocorrelation signal spot images and the displacement amount $S(\Delta t)$ of the object 30 attained between the first and second timings $t_1$ and $t_2$ have such a relationship as expressed by the following equation (4).

$$S(\Delta t) = \alpha N(\Delta t) \tag{4}$$

where $\alpha$ is a value determined dependently on the optical system of the displacement measuring apparatus 1. Accordingly, through detecting the distance between the 0-th diffraction spot image and one of the first ($\pm 1$-th) diffraction spot images (autocorrelation signal spot images), it is possible to calculate the expression (4) to obtain the displacement amount of the object 30 attained between the first and second timings $t_1$ and $t_2$.

Figure 2B:
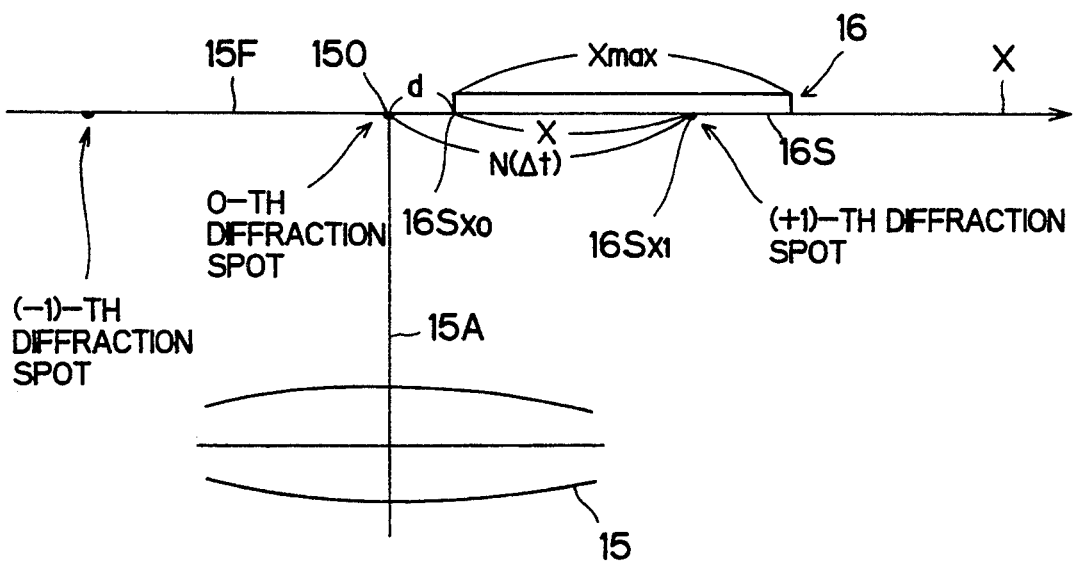

The detecting part 1D includes a position sensitive light detector (which will be referred to as a "PSD", hereinafter) 16 for detecting one dimensional position of a peak point of the intensity of a beam spot image received on its beam spot receiving area 16S. As shown in FIGS. 2(a) and 2(b), the PSD 16 is provided at such a position that the beam spot receiving area 16S is positioned on the focal plane 15F of the Fourier transform lens 15. The PSD 16 is positioned so that its one dimensional direction X of the beam spot receiving area 16S extends parallel to the direction V along which the object 30 is moved. (The one dimensional direction X of the beam spot receiving area 16S therefore extends along the plane of the sheet of drawing of FIG. 1.) It is noted that an original point $16S_{x0}$ of the beam spot receiving area 16S is positioned apart from the center point 150 with a distance of d in the X direction.

Since the PSD 16 is provided in the above-described position, the +1-th diffraction spot image (one of the pair of autocorrelation signal spot images) is formed on the beam spot receiving surface 16S of the PSD 16, as shown in FIGS. 2(a) and 2(b). The PSD 16 detects a distance X along the X direction between the original point $16S_{x0}$ and a peak point of the intensity of the +1-th diffraction spot image (which will be referred to as a "+1-th diffraction spot peak point $16_{x1}$"), and outputs a signal indicative of the value of X. Accordingly, the above-described distance $N(\Delta t)$ defined between the 0-th diffraction spot image and the ($\pm 1$)-th diffraction spot image is expressed by the following equation (5).

$$N(\Delta t) = X + d \tag{5}$$

As apparent from the above, it is possible to calculate the displacement amount $S(\Delta t)$ of the object 30, through the equations (4) and (5), from the value of X detected by the PSD 16.

In the calculation-control part 1E, a calculation-control unit 17 is provided to be connected to the PSD 16. The calculation-control unit 17 such as a computer device receives the signal indicative of the value of X from the PSD 16, and calculates the equations (4) and (5) to thereby obtain the displacement amount $S(\Delta t)$ of the object 30.

The calculation-control unit 17 is further connected to the AOD controller 20. The calculation-control unit 17 is supplied with a signal indicative of information of the irradiation time interval $\Delta t$ from the AOD controller 20 which controls the AOD 4 to deflect the laser beam to be directed in the predetermined direction at the first and second timings with the time interval of $\Delta t$. Accordingly, the calculation-control unit 17 calculates the following equation (6) to thereby obtain a velocity of the object 30.

$$v = S(\Delta t)/\Delta t \tag{6}$$

A velocity displaying unit 18 is connected to the calculation-control unit 17 for displaying the velocity of the object 30 thus calculated in the calculation-control unit 17.

The calculation-control unit 17 serves not only to calculate the above-described equations but also to control the operations of entire part of the measuring apparatus 1. More specifically to say, the calculation-control unit 17 controls the AOD controller 20 to allow the AOD 4 to deflect the He—Ne laser beam to be directed in the predetermined direction at desired timings and controls the FLC-SLM controller 19 to drive the first and second FLC-SLM's 7 and 13 in desired timings.

Figure 3:
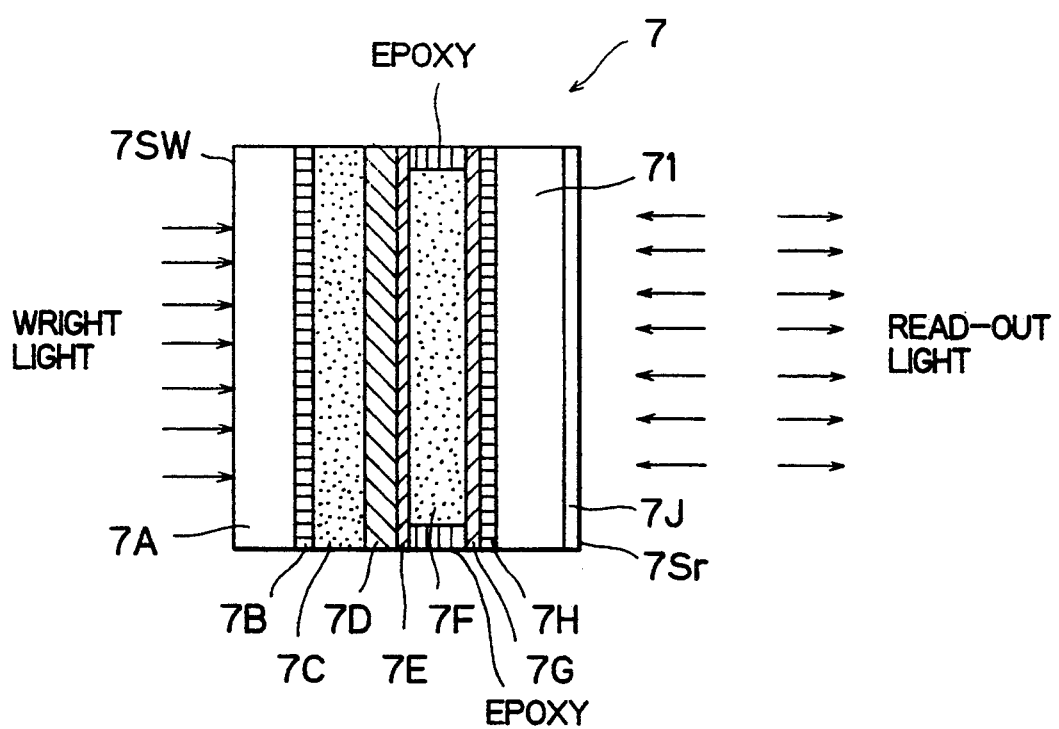
FIG. 3 schematically shows a cross-section of an FLC-SLM employed in the optical displacement measuring apparatus of the present invention.

The first FLC-SLM 7 employed in the measuring apparatus 1 of the present invention as described above will be described hereinafter, with reference to FIG. 3.

The FLC-SLM 7 has a sandwich structure in which a ferroelectric liquid crystal layer (which will be referred to as a "liquid crystal layer", hereinafter) 7F is sandwiched between a pair of orientation layers 7E and 7G. A dielectric mirror 7D, an amorphous silicon layer (which will be referred to as an "α-Si layer", hereinafter) 7C, a transparent electrode layer 7B and a glass layer 7A are provided on the orientation layer 7E, in this order. Another transparent electrode layer 7H, a glass layer 7I, and an antireflection coating layer 7J are provided on the orientation layer 7G, in this order. The liquid crystal layer 7F is formed of chiral smectic C liquid crystal, and serves to memorize a pattern image therein. The α-Si layer 7C is a photoconductor layer serving as an optical intensity-voltage converter. A surface of the glass layer 7A exposed to atmospheric outside defines the above-described write side $7S_w$, and a surface of the antireflection coating layer 7J exposed to atmospheric outside defines the above-described read side $7S_r$. The FLC-SLM controller 19 is electrically connected to the electrode layers 7B and 7H for applying write driving voltage $V_w$, write compensation voltage $V_{wc}$, erase driving voltage $V_e$, and erase compensation voltage $V_{ec}$ between the electrode layers 7B and 7H, respectively, to drive the FLC-SLM 7, as will be described later. It is noted that the polarity of the write driving voltage $V_w$ is opposite to that of the erase driving voltage $V_e$. The polarity of the write compensation voltage $V_{wc}$ is opposite to that of the write driving voltage $V_w$, and the polarity of the erase compensation voltage $V_{ec}$ is opposite to that of the erase driving voltage $V_e$. The absolute value of the write compensation voltage $V_{wc}$ is equal to that of the write driving voltage $V_w$, and the absolute value of the erase compensation voltage $V_{ec}$ is equal to that of the erase driving voltage $V_e$. The compensation voltages $V_{wc}$ and $V_{ec}$ are applied between the electrode layers 7B and 7H immediately after when the driving voltages $V_w$ and $V_e$ are applied therebetween, respectively. The compensation voltages $V_{wc}$ and $V_{ec}$ serve to prevent the liquid crystal layer 7F from being damaged.

As shown in FIG. 1, a light emitting diode (LED) 6 is provided for irradiating an entire part of the write side $7S_w$ (the surface of the glass layer 7A exposed to atmospheric outside) with uniform light (erase light) to thereby erase a pattern image which has been recorded in the liquid crystal layer 7F.

The second FLC-SLM 13 has the same structure as that of the first FLC-SLM 7 described above. It is noted that the FLC-SLM controller 19 also applies the write driving voltage $V_w$, write compensation voltage $V_{cw}$, erase driving voltage $V_e$, and erase compensation voltage $V_{ec}$ between the electrode layers 13B and 13H, to drive the FLC-SLM 13. Another light emitting diode (LED) 14 is provided for irradiating an entire part of the write side $13S_w$ with uniform light (erase light) to thereby erase a pattern image which has been recorded in the liquid crystal layer 13F.

The details of the FLC-SLM are described in a document "Bistable spatial light modulator using a ferroelectric liquid crystal" (pp. 285-287 of "OPTICS LETTERS" published on Mar. 1, 1990).

The FLC-SLM can attain an extremely high speed switching operation (high speed pattern image write-and-erase operation), and therefore can allow the displacement measuring apparatus 1 of the present invention to perform a real-time measurement operation. In addition, since the FLC-SLM is a binary recording device, the FLC-SLM is suitable for recording therein the speckle patterns and the image of Young's interference fringes.

Figure 4:
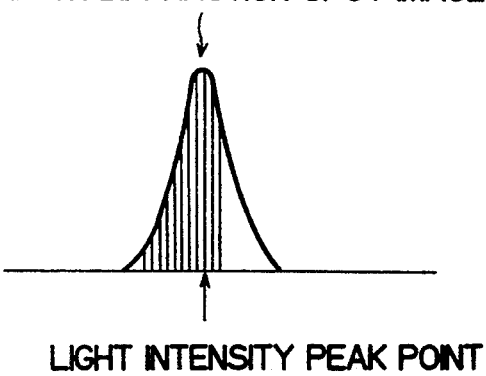
FIG. 4 illustrates a method for scanning the light intensity of the autocorrelation signal spot image to search a peak point thereof.

It is further noted that the PSD 16 employed in the measuring apparatus 1 of the present invention can directly detect a position of the intensity peak point of the beam spot (autocorrelation signal spot) received on the PSD 16. If the apparatus 1 is not employed with the PSD, however, in order to detect the position of the intensity peak point of the autocorrelation signal spot image, it will become necessary to scan the autocorrelation signal spot image to search the intensity peak point thereof, as shown in FIG. 4 However, since the apparatus 1 of the present invention is employed with the PSD 16, it is unnecessary to scan the autocorrelation signal spot image or to perform an intricate calculation for searching the intensity peak point thereof, Thus, the PSD 16 can detect the intensity peak point of the autocorrelation signal spot image, with a sufficiently high speed. In the measuring apparatus 1 of the present invention, the above-described FLC-SLM's 7 and 13 attaining the high speed write-and-erase operations are thus combined with the PSD 16 which attains the high speed detecting operation. The measuring apparatus 1 of the present invention therefore can certainly attain the real-time measuring operation.

The displacement measuring apparatus 1 having the above-described structure is controlled by the calculation-control unit 17 to be operated in the manner as shown in the timing chart of FIG. 5 so that the autocorrelation signal spot image (+1-th diffraction spot image) may be formed on the beam spot receiving area 16S of the PSD 16, on the basis of which the calculation-control unit 17 may calculate the velocity v of the object 30. The operation of the apparatus 1 for forming the autocorrelation signal spot image (which will be referred to as an "autocorrelation signal spot forming operation F", hereinafter) will be described below.

In the autocorrelation signal spot forming operation F, the LED 6 first radiates the uniform light (erase light) onto an entire surface of the write side $7S_w$ of the first FLC-SLM 7. During when the LED 6 thus irradiates the write side $7S_w$ with the erase light, the FLC-SLM controller 19 is controlled by the calculation-control unit 17 to apply the erase compensation voltage $V_{ec}$ and the erase driving voltage $V_e$, in this order, between the electrode layers 7B and 7H. (The periods of time for applying the voltages $V_{ec}$ and $V_e$ are equal to each other.) As a result, a pattern image which has been already recorded in the liquid crystal layer 7F of the FLC-SLM 7 is erased, so that the FLC-SLM 7 is initialized.

Then, the FLC-SLM controller 19 is controlled by the calculation-control unit 17 to apply the write compensation voltage $V_{wc}$ and the write driving voltage $V_w$, in this order, between the electrode layers 7B and 7H. (The periods of time for applying the voltages $V_{wc}$ and $V_w$ are equal to each other.)

During when the write driving voltage $V_w$ is thus applied between the electrode layers 7B and 7H, the AOD controller 20 is controlled by the calculation-control unit 17 to irradiate the object 30 with the He—Ne laser beam at the first and second irradiation timings $t_1$ and $t_2$, with the time interval $\Delta t$ being formed therebetween. As a result, the first and second speckle patterns are recorded in the liquid crystal layer 7F of the FLC-SLM 7.

It is noted that the He—Ne laser beam emitted from the laser source 2 is continuously introduced onto the read side $7S_r$ of the FLC-SLM 7 through the first read light introducing path 10. Accordingly, the He—Ne laser beam radiated on the read side $7S_r$ at the time when the recording operation of the first and second speckle patterns is completed is modulated in the liquid crystal layer 7F in accordance with the first and second speckle patterns recorded therein and is emitted out of the FLC-SLM 7. Thus, the first and second speckle patterns recorded in the liquid crystal layer 7F are read out from the FLC-SLM 7, so that the image of Young's interference fringes is obtained on the focal plane of the Fourier transform lens 12 at its imaging field.

The FLC-SLM controller 20 further applies the erase compensation voltage $V_{ec}$ and the erase driving voltage $V_e$ between the electrode layers 13B and 13H of the second FLC-SLM 13 in this order, during when the FLC-SLM controller 20 supplies the first FLC-SLM 7 with the voltages $V_{wc}$ and $V_w$. (The periods of time for applying the voltages $V_{ec}$ and $V_e$ are equal to each other.) During when the FLC-SLM 13 is thus applied with the voltages $V_{ec}$ and $V_e$, the LED 14 irradiates an entire surface of the write side $13S_w$ of the FLC-SLM 13 with uniform light (erase light). As a result, a pattern image which has been recorded in the liquid crystal layer 13F of the FLC-SLM 13 is erased, and the FLC-SLM 13 is initialized.

After when the speckle pattern recording operation of the first FLC-SLM 7 is completed, the FLC-SLM controller 19 applies the write compensation voltage $V_{wc}$ and the write driving voltage $V_w$ between the electrode layers 13B and 13H of the second FLC-SLM 13 in this order. (The periods of time for applying the voltages $V_{wc}$ and $V_w$ are equal to each other.) As a result, the image of Young's interference fringes is recorded in the liquid crystal layer 13F of the FLC-SLM 13.

The He—Ne laser beam is also continuously introduced onto the read side $13S_r$ of the FLC-SLM 13. Accordingly, at the time when the image of Young's interference fringes is thus recorded in the liquid crystal layer 13F, the laser beam modulated in the liquid crystal layer 13F and emitted out of tile FLC-SLM 13 forms the autocorrelation signal spot image on the focal plane 15F of the Fourier transform lens 15. Thus, the image of Young's interference fringes is read out of the FLC-SLM 13.

Thus, the autocorrelation signal spot forming operation F is completed.

After when the autocorrelation signal spot forming operation F is thus completed, since the autocorrelation signal spot image (+1-th diffraction spot image) is incident on the beam spot receiving area 16S of the PSD 16, the PSD 16 supplies the calculation-control unit 17 with the signal indicative of the value of the distance X between the original point $S_{x0}$ and the autocorrelation signal spot peak point $S_{x1}$. Then, the calculation-control unit 17 calculates the displacement amount $S(\Delta t)$ and the velocity value v of the object 30, and the velocity displaying unit 18 displays thereon the calculated velocity v.

In order to detect the state how the velocity of the object 30 is changed, the calculation-control unit 17 controls the entire part of the measuring apparatus 1 to repetitively perform the above-described autocorrelation signal spot forming operation F with a desired time interval.

It should be noted that since the FLC-SLM's 7 and 13 having the high switching speed and the PSD 16 having the high detecting speed are employed in the measuring apparatus 1 of the present invention, the measuring apparatus 1 can repeat the autocorrelation signal spot forming operations F with a very short time interval. Accordingly, with the use of the measuring apparatus 1 of the present invention, it is possible to measure how the velocity of the object 30 is changed, with a very short time interval.

In the case where the autocorrelation signal spot forming operation F is conducted a plurality of times for detecting how the velocity of the object is changed, however, if the value of the irradiation time interval $\Delta t$ is fixed for all the plural operations F, the following problem will be occurred:

If the velocity of the object 30 is changed to be increased, since the displacement amount $S(\Delta t)$ in the fixed irradiation time interval $\Delta t$ is also increased, the distance $N(\Delta t)$ between the 0-th diffraction spot image and the +1-th diffraction spot image (autocorrelation signal spot image) is increased, as apparent from the already-described equation (4). As a result, the value of X defined as the distance between the original point $S_{x0}$ and the peak point $S_{x1}$ of the autocorrelation signal spot image is also increased, as apparent from the equation (5). If the velocity of the object 30 is too large, therefore, the value X erroneously becomes larger than a maximum length $X_{max}$ shown in FIGS. 2(a) and 2(b) which represents the length of the beam spot receiving area 16S, as a result of which the autocorrelation signal spot image fails to be incident on the beam spot receiving area 16S. In such a case, the PSD 16 may not detect the autocorrelation signal spot image, and therefore the measuring apparatus 1 may not measure the displacement amount or the velocity of the object 30. Even in the case where the value X is not larger than the maximum length $X_{max}$, if the velocity of the object 30 is very large and therefore the value X has such a value that a difference between the value X and the maximum length $X_{max}$ is very small, the autocorrelation signal spot image is formed on the peripheral portion of the beam spot receiving area 16S. The PSD 16 has, however, such a problem that it may not detect, with high accuracy, the position of a light intensity peak point of a beam spot which is incident on the peripheral portion of the beam spot receiving area 16S. Accordingly, if the autocorrelation signal spot image is formed on the peripheral portion of the beam spot receiving area 16S, the PSD 16 may not detect the peak position of the autocorrelation signal spot image with high accuracy.

Similarly as described above, if the velocity of the object 30 is very small, the autocorrelation signal spot image fails to be incident on the beam spot receiving area 16S or is incident thereon at its peripheral portion. Accordingly, in this case, the measuring apparatus 1 may not detect the displacement amount or the velocity of the object 30 or may not detect them with high accuracy.

As apparent from the above, the autocorrelation signal spot image should be formed on the beam spot receiving area 16S of the PSD 16 at its approximately center portion, in order to allow the PSD 16 to detect the intensity peak position of the autocorrelation signal spot image with high accuracy and therefore to allow the measuring apparatus 1 to measure the displacement amount and the velocity of the object 30 with high accuracy.

Accordingly, in the measuring apparatus 1 of the present invention, the calculation-control unit 17 controls the AOD controller 20 to adjust the irradiation time interval $\Delta t$, in accordance with the velocity of the object 30, to thereby adjust the values of $N(\Delta t)$ and X to such values as allowing the autocorrelation signal spot image to be formed at the approximately center portion of the beam spot receiving area 16S, irrespective of the velocity of the object 30, as will be described in detail hereinafter.

It is now assumed that the autocorrelation signal spot forming operations F are conducted for plural times, and an arbitrary autocorrelation signal spot forming operation which is conducted n-th of the plural times will be referred to as a "n-th autocorrelation signal spot forming operation F(n)", hereinafter, where n is an arbitrary integer (n=1, 2, ... ). It is further assumed that the value of the irradiation time interval $\Delta t$ selected in the n-th autocorrelation signal spot forming operation F(n) will be referred to as an "n-th irradiation time interval $\Delta t(n)$", hereinafter.

Figure 6A:
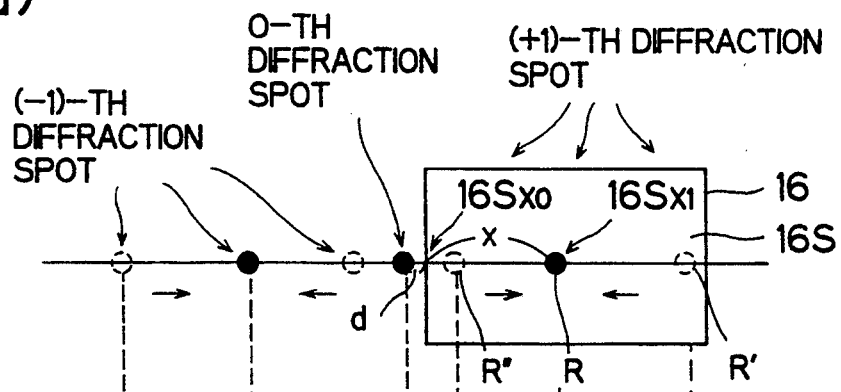
FIG. 6(a) illustrates the state how the autocorrelation signal spot image is formed through a feed-back control operation of the calculation-control unit.
Figure 6B:
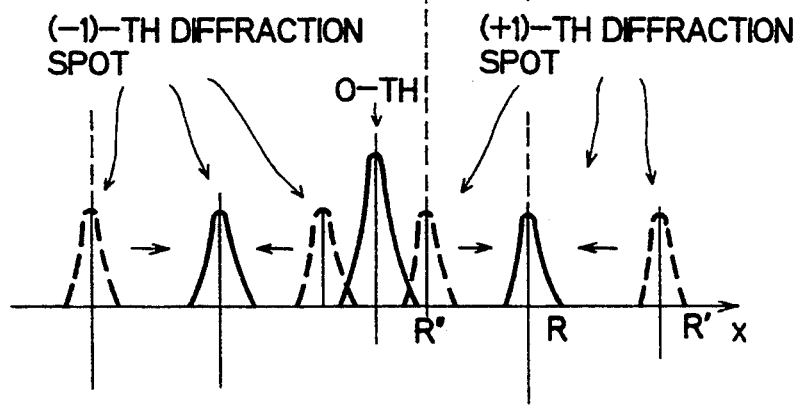
FIG. 6(b) illustrates the state how the autocorrelation signal spot image is formed through the feed-back control operation of the calculation-control unit, in which the light intensity of the autocorrelation signal spot image is shown.

In the case where it is judged that the velocity of the object 30 is being increased based on the result obtained from the n-th autocorrelation signal spot forming operation F(n), it can be further judged that the autocorrelation signal spot image may be formed on the peripheral portion of the area 16S or outside thereof as indicated by the reference character R' in FIGS. 6(a) and 6(b) in a (n+1)-th autocorrelation signal spot forming operation F(n+1) which is to be conducted next to the n-th operation F(n), if a (n+1)-th irradiation time interval $\Delta t(n+1)$ in the (n+1)-th operation F(n+1) is selected to be equal to a n-th irradiation time interval $\Delta t(n)$ of a n-th operation F(n). Accordingly, the (n+1)-th irradiation time interval $\Delta t(n+1)$ should be selected to be smaller than the n-th irradiation time interval $\Delta t(n)$ so that the autocorrelation signal spot image may be formed on the approximately central portion of the area 16S in the (n+1)-th operation F(n+1), as indicated by the reference character R in FIGS. 6(a) and 6(b).

Similarly, in the case where it is judged that the velocity of the object 30 is being decreased, if the (n+1)-th irradiation time interval $\Delta(n+1)$ is selected to be equal to the n-th irradiation time interval $\Delta(n)$, the autocorrelation signal spot image may be formed on the peripheral portion of the area 16S or outside thereof as indicated by the reference character R" in FIGS. 6(a) and 6(b) in the (n+1)-th operation F(n+1). Accordingly, the (n+1)-th irradiation time interval $\Delta t(n+1)$ should be selected to be larger than the n-th irradiation time interval $\Delta t(n)$ so that the autocorrelation signal spot image may be formed on the approximately central portion of the area 16S in the (n+1)-th operation F(n+1) as indicated by the reference character R in FIGS. 6(a) and 6(b).

In order to perform the above-described operation, the calculation-control unit 17 performs a feed-back control operation as described below.

When the n-th (n=1, 2, ... ) autocorrelation signal spot forming operation F(n) is completed, the PSD 16 supplies the calculation-control unit 17 with the signal indicative of the value of X and the calculation-control unit 17 calculates the above-described equations (4) through (6) to obtain the displacement amount $S(\Delta t(n))$ and the velocity V of the object 30, as described already. Simultaneously with the calculation, the calculation-control unit 17 judges whether or not the velocity of the object 30 is being increased or decreased, based on the value of X which is supplied to the unit 17 from the PSD 16. In the case where it is judged that the velocity of the object 30 is being increased, the calculation-control unit 17 controls the AOD controller 20 to allow the AOD 4 to irradiate the object 30 with the laser beam, with the irradiation time interval $\Delta t(n+1)$ which is smaller than the irradiation time interval $\Delta t(n)$, in the (n+1)-th autocorrelation signal spot forming operation F(n+1) which is to be conducted next to the n-th operation F(n). To the contrary, in the case where it is judged that the velocity of the object is being decreased, the calculation-control unit 17 controls the AOD controller 20 to allow the AOD 4 to irradiate the object 30 with the laser beam with the irradiation time interval $\Delta t(n+1)$ which is larger than the irradiation time interval $\Delta t(n)$, in the (n+1)-th autocorrelation signal spot forming operation F(n+1).

A preferred example of the manner how the calculation-control unit 17 judges whether the velocity of the object is being increased or decreased on the basis of the result (the data of X) of the n-th operation F(n) will be described hereinafter.

In the case where the X value detected in the n-th operation F(n) is larger than $X_{max}/2$, it can be judged that the velocity of the object is being increased. To the contrary, in the case where the X value detected in the n-th operation F(n) is smaller than $X_{max}/2$, it can be judged that the velocity of the object is being decreased. Accordingly, as one example of judging whether the velocity of the object is being increased or decreased, the calculation-control unit 17 judges whether the data of X supplied thereto from the PSD 16 at the n-th operation F(n) is larger or smaller than the value of $X_{max}/2$.

According to the measuring apparatus 1 of the present invention, since the irradiation time interval $\Delta t(n)$ is thus adjusted for each autocorrelation signal spot forming operation F(n) in accordance with the velocity of the object 30, it is possible to allow the autocorrelation signal spot image to be formed on the approximately center portion of the beam spot receiving area 16S of the PSD 16 at each autocorrelation signal spot forming operation F(n). Accordingly, the PSD 16 may always detect the intensity peak point of the autocorrelation signal spot image with high accuracy, and therefore the measuring apparatus 1 of the present invention may always detect the displacement amount and the velocity of the object 30 with high accuracy. In addition, even if the velocity of the object 30 is changed with a large amount, the autocorrelation signal spot image can be always formed on the beam spot receiving area 16S of the PSD 16 and therefore the measurement of the displacement amount and the velocity can be always attained. Accordingly, the measuring apparatus of the present invention may attain a high dynamic range.

Figure 7:
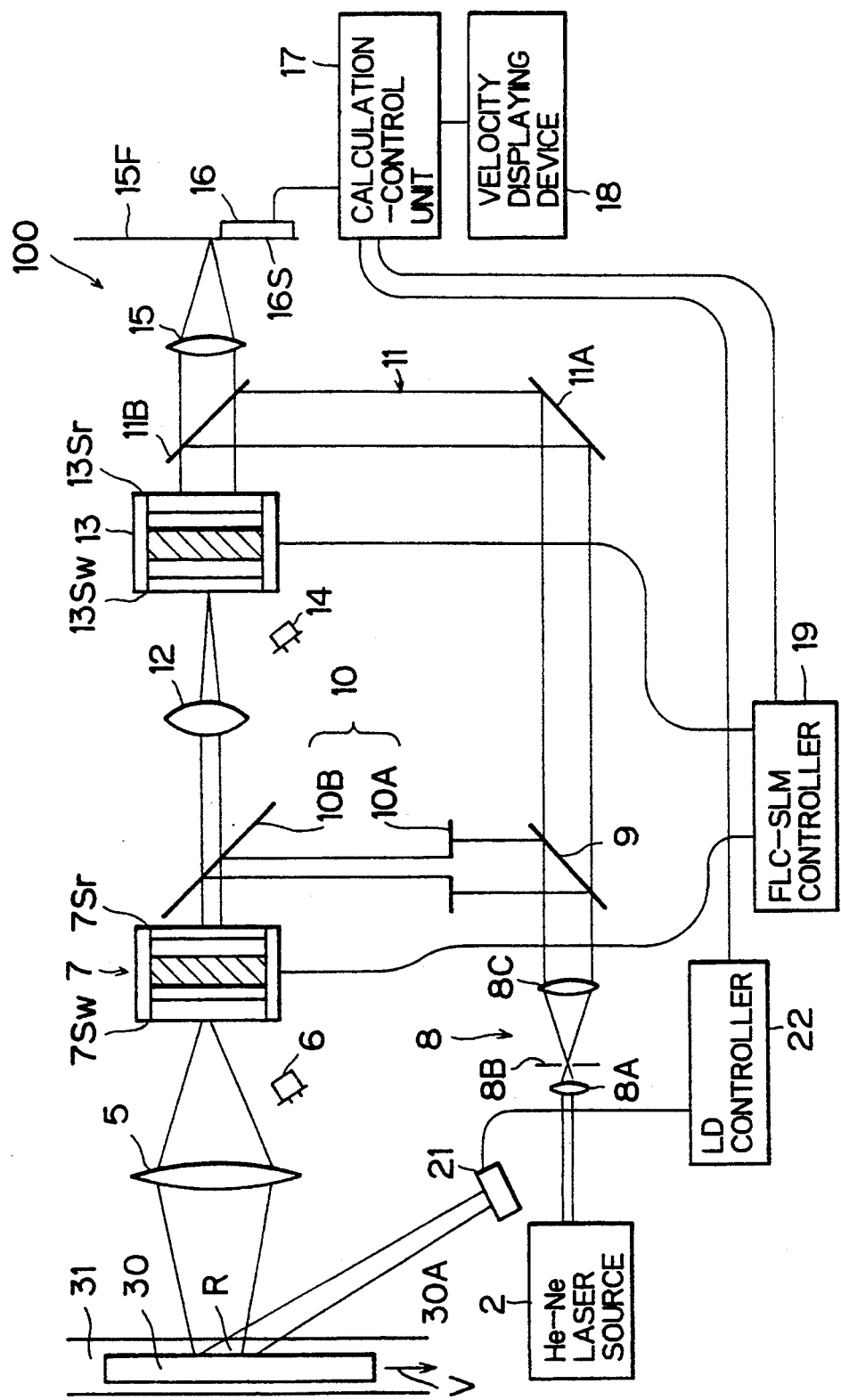
FIG. 7 is a schematic plan view of an optical system of an optical displacement measuring apparatus of the second preferred embodiment of the present invention.

A displacement measuring apparatus of a second preferred embodiment will be described below with reference to FIG. 7. The displacement measuring apparatus 100 of the present embodiment is the same as the apparatus 1 of the first embodiment, except the following point: Though the AOD 4 deflects the laser beam emitted from the He—Ne laser source 2 onto the object 30 in the apparatus 1 of the first embodiment, a laser diode (LD) 21 is provided separately from the He—Ne laser source 2 for irradiating laser beam pulses onto the object 30 in the apparatus 100 of the present embodiment. More specifically to say, in the apparatus 100 of the present embodiment, the LD 21 irradiates the laser pulse beams on the object 30 at the first and second irradiation timings $t_1$ and $t_2$, with the irradiation time interval $\Delta t$ being formed therebetween. In the apparatus 100 of the present embodiment, furthermore, an LD controller 22 is provided for controlling the pulse interval (irradiation time interval $\Delta t$) of the LD 21, in place of the AOD controller 20.

Figure 8:
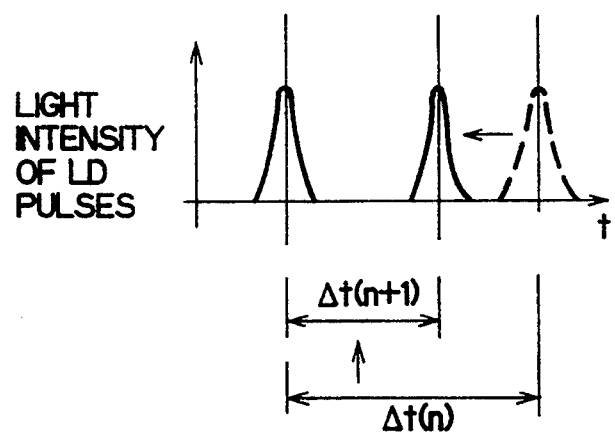
FIG. 8 illustrates the timing at which an LD is controlled to emit laser beam pulses in accordance with the feed-back control operation of the calculation-control unit 17 in the optical displacement measuring apparatus of the second preferred embodiment.

The autocorrelation signal spot forming operation F attained in the apparatus 100 of the present embodiment is therefore equal to that attained in the apparatus 1 of the first embodiment as shown in FIG. 5. In the apparatus 100 of the present embodiment, furthermore, similarly as in the apparatus 1 of the first embodiment, the calculation-control unit 17 feed-back controls the LD controller 22 to adjust the pulse interval (irradiation time interval) $\Delta t$, to thereby allow the autocorrelation signal spot image to be formed at the center area of the light incident area 16S, irrespective of the velocity of the object 30. More specifically to say, for example, if it is judged from the result of the n-th autocorrelation signal spot forming operation F(n) that the velocity of the object 30 is being increased, the (n+1)-th pulse interval $\Delta t(n+1)$ in the (n+1)-th operation F(n+1) is adjusted to be smaller than the n-th pulse interval $\Delta t(n)$ in the n-th operation F(n), as shown in FIG. 8.

Figure 9:
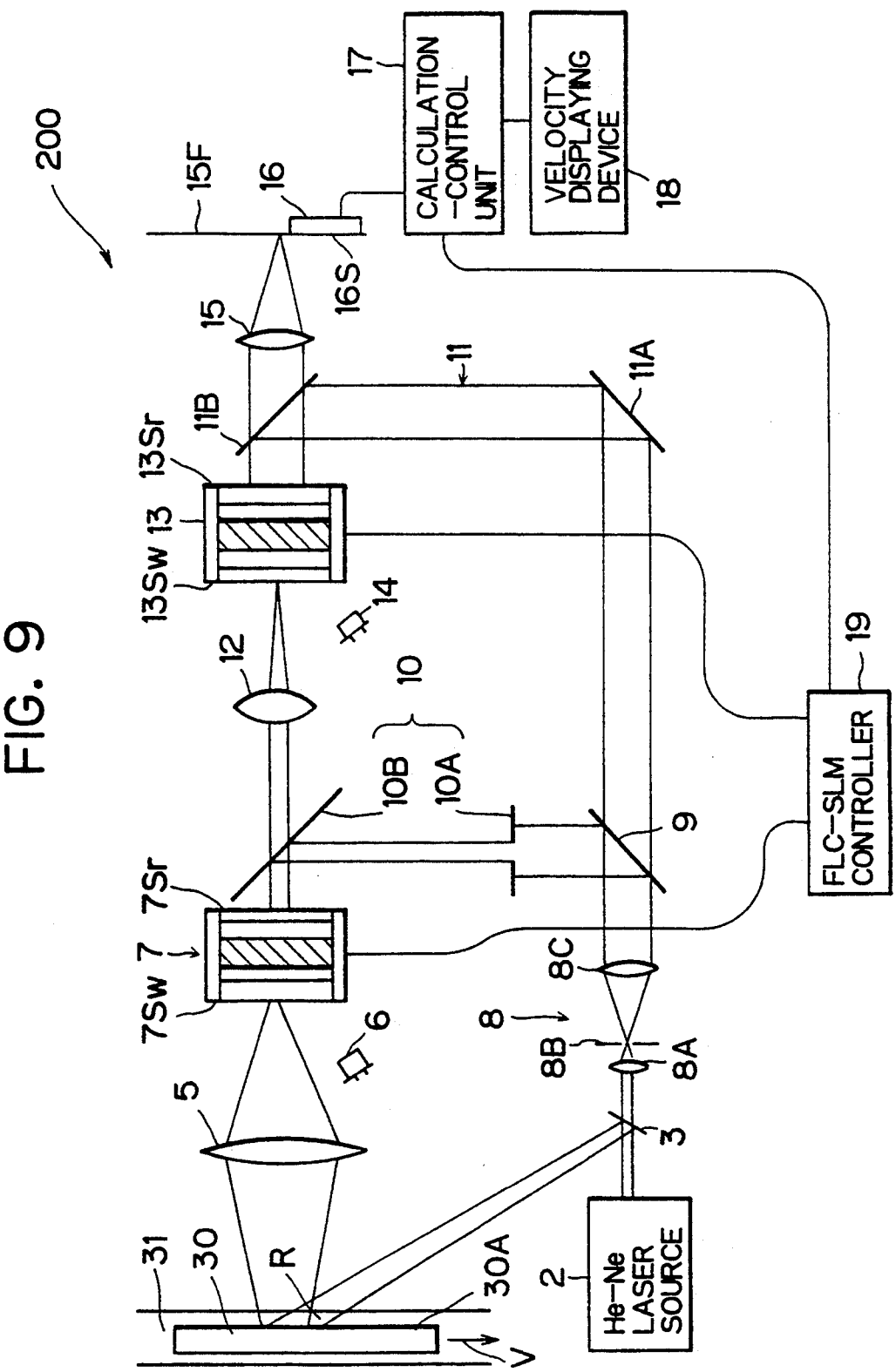
FIG. 9 is a schematic plan view of an optical system of an optical displacement measuring apparatus of a third preferred embodiment of the present invention.

A displacement measuring apparatus of a third preferred embodiment will be described below with reference to FIG. 9. The displacement measuring apparatus 200 of the embodiment is equal to the apparatus 1 of the first embodiment, only except that the apparatus 200 is not provided with the AOD 4 or the AOD controller 20. In this case, the half mirror 3 reflects the part of the He—Ne laser beam in the predetermined direction so that the He—Ne laser beam may be always irradiated on the fixed position R on the conveying path of the conveying device 31. Accordingly, as shown in FIG. 10, the object 30 is continuously irradiated with the He—Ne laser beam, and the speckle patterns are always formed on the write side $7S_w$ of the FLC-SLM 7.

Figure 10:
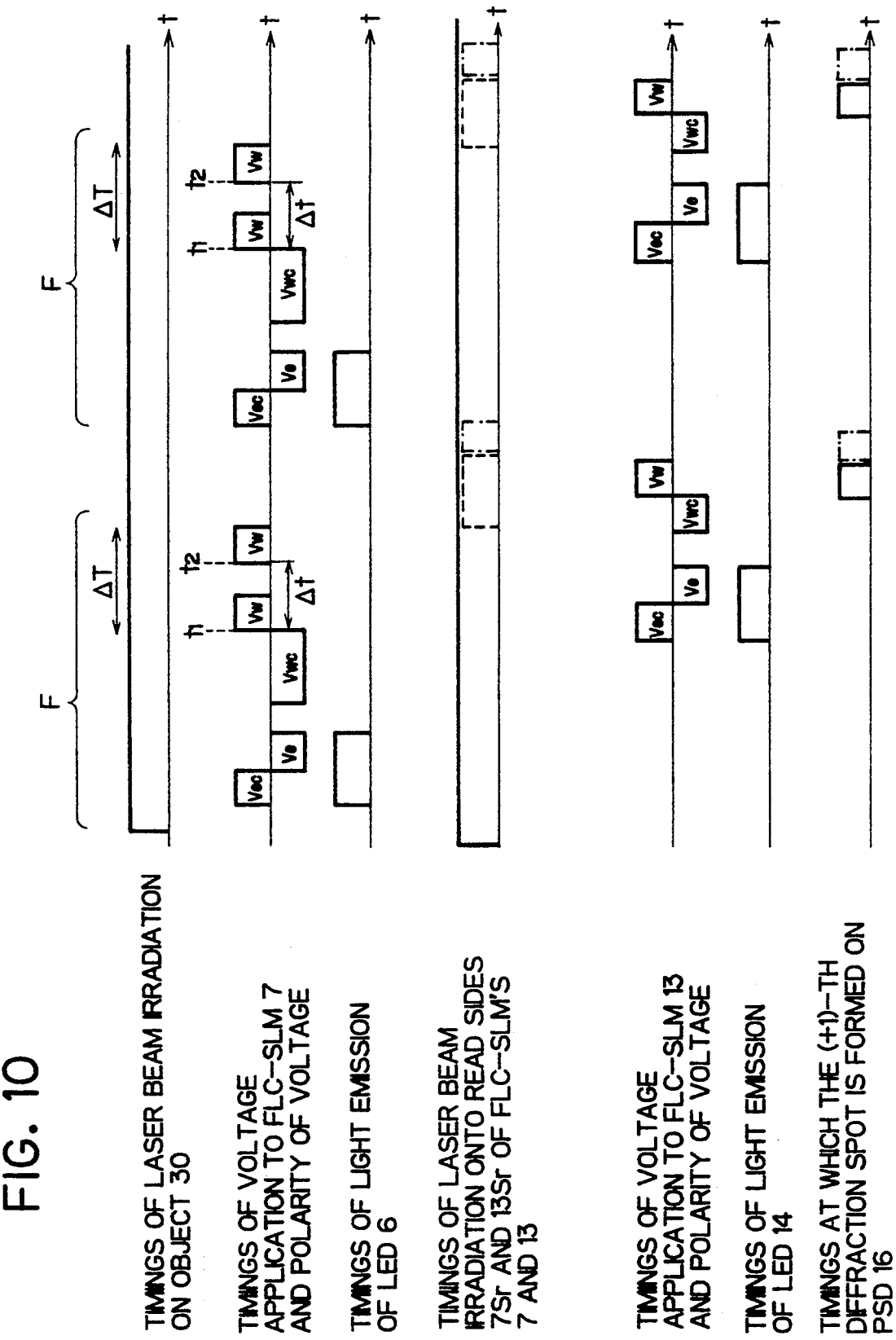
FIG. 10 is a timing chart of the autocorrelation signal spot forming operations F conducted in the optical displacement measuring apparatus of the third preferred embodiment of the present invention.

In the apparatus 200 of the present embodiment, as also shown in FIG. 10, the FLC-SLM controller 19 supplies the FLC-SLM 7 with first and second write driving voltage pulses $V_{w1}$ and $V_{w2}$, at only the first and second irradiation timings $t_1$ and $t_2$, with the irradiation time interval $\Delta t$ being formed therebetween. Accordingly, only the first and second speckle patterns which are formed at the irradiation timings $t_1$ and $t_2$ are recorded in the liquid crystal layer 7F of the FLC-SLM 7. (It is noted that, in this case, the total amount of the pulse widths of the first and second write driving voltage pulses is adjusted to be equal to the period of time when the write compensation voltage $V_{wc}$ is applied to the FLC-SLM 7, to thereby prevent the liquid crystal layer 7F from being damaged.)

In the apparatus 200 of the present embodiment, furthermore, similarly as in the apparatus 1 of the first embodiment, the calculation-control unit 17 feed-back controls the FLC-SLM controller 19 to adjust the time interval $\Delta t$ between the first and second write driving voltage application timings $t_1$ and $t_2$, to thereby allow the autocorrelation signal spot image to be always formed at the approximately center area of the beam spot receiving area 16S, irrespective of the velocity of the object 30.

While the present invention has been described in detail and with reference to specific embodiments thereof, it will be apparent to one skilled in the art that various changes and modifications can be made therein without departing from the spirit and scope thereof.

For example, in the feed-back control operation for feed-back controlling the time interval $\Delta t(n+1)$ of an (n+1)th operation F(n+1;n=1, 2, ...) of the above-described embodiments, it is judged whether the velocity of the object is being increased or decreased, based on the X data which is obtained in the single n-th operation F(n). However, it is possible to judge whether the velocity of the object is being increased or decreased, based on the X data obtained in plural operations F which have been previously conducted. For example, it is possible to judge whether the velocity of the object is being increased or decreased, based on the X data obtained in the (n−2)-th, (n−1)-th and n-th operations F(n−2), F(n−1) and F(n). In such a case, it is possible to estimate the value of the velocity to be detected in the (n+1)-th operation F(n+1). Accordingly, it becomes easier to adjust the (n+1)-th irradiation time interval $\Delta t(n+1)$ to such a value as suitable for allowing the autocorrelation signal spot image to be formed on the approximately center portion of the area 16S in the (n+1)-th operation F(n+1).

In addition, in the above-described embodiments, the calculation-control unit 17 feed-back controls the irradiation time interval $\Delta t(n+1)$, based on the data of X(n) detected by the PSD 16. However, the calculation-control unit 17 may control the irradiation time interval $\Delta t(n+1)$, based on the data of $N(\Delta t(n))$, $S(\Delta t(n))$ or v which are calculated in the calculation-control unit 17 in the n-th operation F(n).

Furthermore, the calculation-control unit 17 may feed-back control the irradiation time interval $\Delta t(n+1)$, based on the image of Young's interference fringes formed in the n-th operation F(n) or based on the speckle patterns formed in the n-th operation F(n). An optical measuring apparatus 300 of the modification of the present invention shown in FIG. 11 feed-back controls the irradiation time interval $\Delta t(n+1)$, based on the image of Young's interference fringes. In the apparatus 300, a half mirror 10C is provided between the half mirror 10B and the Fourier transform lens 12. Another Fourier transform lens 12' and another PSD 16' are also provided in the apparatus 300 so that the Fourier transform lens 12' may subject a part of the laser beam reflected from the half mirror 10C to a Fourier transformation to form the image of Young's interference fringes on a beam spot receiving area 16'S of the PSD 16'. The PSD 16' is positioned so that a first bright line of the image of Young's interference fringes may be incident on the beam spot receiving area 16'S, as shown in FIG. 11. The PSD 16' therefore detects the position of the first bright line of the Young's interference fringes.

In the apparatus 300, the calculation-control unit 17 performs only the calculation operation, but another control unit 17' is provided separately from the calculation unit 17 for performing the control operation including the irradiation time interval feed-back operation. The control unit 17' is connected to the PSD 16' and is also connected to the LD controller 22 and the FLC-SLM controller 19. Accordingly, the control unit 17' is supplied with a signal indicative of the position of the first blight line of the Young's interference fringes from the PSD 16'. It is noted that the position of the first blight line of the Young's interference fringe represents a value of the interval $K(\Delta t)$ between each two adjacent bright lines of the Young's interference fringes. Since the interval K(Δt) and the distance N(Δt) have the relationship represented by the equation (3) as described already, it can be judged whether or not the (+1)-th diffraction spot may be incident on the area 16S of the PSD 16 at its central portion, based on the detected value of the interval K(Δt). More specifically to say, since the interval K(Δt) and the displacement amount S(Δt) of the object 30 have the relationship represented by the equations (1) and (2), it can be judged, based on the detected value of the interval K(Δt), whether the velocity of the object 30 is being increased or decreased and therefore whether or not the (+1)-th diffraction spot may be incident on the area 16S of the PSD 16 at its central portion. Accordingly, in the apparatus 300 of the present modification, the control unit 17' feed-back controls the irradiation time interval Δt, based on the signal supplied thereto from the PSD 16'. In this case, it should be noted that as the velocity of the object is increased, the interval K(Δt) is decreased but the distance N(Δt) is increased, and as the velocity of the object is decreased, the interval K(Δt) is increased but the distance N(Δt) is decreased, as apparent from the equations (1) through (3).

In the above-described embodiments, the feed-back control operation is conducted, in the case where it is desired to detect how the velocity of the object 30 is changed, i.e., in the case where a plurality of autocorrelation signal spot forming operations F are conducted. However, in the case where it is desired to detect the velocity of the object at a single time, it is preferable to conduct the feed-back control operation, as described hereinafter: In order to detect the velocity of the object at a single time, it is preferable to conduct the autocorrelation signal spot forming operation F two times. In the first operation F(1), a proper value is selected for the irradiation time interval Δt(1). Based on the X data obtained in the first operation F(1), the calculation-control unit 17 estimates the velocity of the object 30. Then, the calculation-control unit 17 calculates a value of the irradiation time interval Δt(2) suitable for allowing the autocorrelation signal spot image to be formed on the approximately central area of the beam spot receiving area 16S. Then, the calculation-control unit 17 conducts the second autocorrelation signal spot forming operation F(2), with the obtained irradiation time interval Δ(2), and calculates the velocity of the object 30, based on the X data obtained in the operation F(2). In this case, therefore, the first autocorrelation signal spot forming operation F(1) serves as a preliminary velocity-measuring operation, and the second operation F(2) serves as a main velocity-measuring operation which can measure the velocity with high accuracy.

Furthermore, in the above-described measuring apparatus 200 of the third preferred embodiment, the half mirror 3 reflects the part of the He—Ne laser beam in the fixed direction so that the He—Ne laser beam may be irradiated on the fixed position R. Accordingly, the apparatus 200 is employed with a fixed half mirror 3. However, a rotatable half mirror 3' may be employed in the apparatus 200. In the case where the apparatus 200 is thus employed with the rotatable half mirror 3', even if the object 30 has a small length along the conveying direction V, it is possible to always keep irradiating the object 30 with the He—Ne laser beam. More specifically to say, even in the case where the object 30 is shifted from the fixed position R, it is possible to irradiate the object 30 with the He—Ne laser beam, through changing a rotational position of the rotatable half mirror 3' to thereby change the direction along which the He—Ne laser beam reflected from the half mirror 3' is directed. It should be noted, however, that it is necessary to allow the half mirror 3' to be positioned at a single rotational position, both at the first and second irradiation timings $t_1$ and $t_2$ at each single operation F. In addition, the rotational position of the half mirror 3' should be fixed during when each write driving voltage $V_w$ is applied to the first FLC-SLM 7. Accordingly, the rotational position of the half mirror 3' should be controlled, in accordance with the write driving voltage $V_w$ application timings, by a half mirror controlling unit (not shown in the drawing) which is controlled by the calculation-control unit 17. That is, the rotational position of the half mirror 3' should be controlled to be fixed at least in a period of time ΔT indicated in FIG. 10.

It should be further noted that, in place of the rotatable half mirror 3', the fixed half mirror 3 and the AOD 4 connected to the AOD controller 20 may be employed in the apparatus 200 of the third embodiment, in the same manner as shown in FIG. 1. In this modification, the AOD controller 20 control is the AOD 4 to always direct the He—Ne laser beam toward the fixed region R on the conveying path, to thereby always irradiate the object 30 with the He—Ne laser beam. In the case where the object is shifted from the fixed region R, the AOD controller 20 control is the AOD 4 to change the deflecting direction to thereby change the direction in which the He—Ne laser beam is directed. Accordingly, it is possible to always irradiate the object with the He—Ne laser beam, irrespective of the position of the object 30. It should be noted that the deflecting direction of the AOD 4 should be fixed at least in the period of time ΔT in FIG. 10, similarly as described above.

In the above-described embodiments, as shown in FIGS. 5 and 10, the He—Ne laser beam (read-out light) is always irradiated on the read-out sides $7S_r$ and $13S_r$ of the FLC-SLM's 7 and 13. However, it may be possible to control to radiate the read-out light onto the read-out sides $7S_r$ and $13S_r$, only at the timing immediately after when the speckle pattern recording operation of each operation F is completed. In other words, it is possible to radiate the He—Ne laser beam on the read-out sides $7S_r$ and $13S_r$, only at the timing immediately after when the application of the write driving voltage $V_w$ to the FLC-SLM 7 is completed, as indicated by dotted line in FIGS. 5 and 10. It is noted that, in order to allow the FLC-SLM 13 to record the Young's interference fringes, it is necessary to apply the voltages $V_{wc}$ and $V_w$ to the FLC-SLM 13 simultaneously when the laser beam is thus radiated on the read-out sides $7S_r$. The selective irradiation of the He—Ne laser beam onto the read-out sides $7S_r$ and $13S_r$ may be performed, with the use of a shutter device (not shown in the drawing) provided between the second collimating lens 8C and the half mirror 9.

Similarly as described above, it may be further possible to irradiate the He—Ne laser beam (read-out light) onto the read-out side $13S_r$, only at the timing immediately after when the Young's fringes pattern recording operation of each operation F is completed. In other words, it may be possible to radiate the He—Ne laser beam on the read-out sides $13S_r$, only at the timing immediately after when the application of the write driving voltage $V_w$ to the FLC-SLM 13 is completed, as indicated by one-dotted chain line in FIGS. 5 and 10. In this case, the (+1)-th diffraction spot (autocorrelation signal spot) is formed at the timing as also indicated by one-dotted chain line in FIGS. 5 and 10. The selective irradiation of the He—Ne laser beam onto the readout side 13S$_r$ may be performed, with the use of another shutter device (not shown in the drawing) provided in the second read light introducing path 11.

In the above-described embodiments, the object 30 is moved, but the displacement measuring apparatus of the present invention is fixed. However, the object 30 may be fixed while the displacement measuring apparatus may be moved. In such a case, the measuring apparatus measures the relative displacement amount and the relative velocity of the object 30 with respect to the measuring apparatus, to thereby obtain an absolute displacement amount and an absolute velocity of the measuring apparatus. For example, the measuring apparatus of the present invention may be mounted in a moving vehicle. The measuring apparatus irradiates the laser beam onto a surface of the ground (the object 30 in this case) at the first and second irradiation timings t$_1$ and t$_2$ to obtain the first and second speckle patterns which represent relative displacement amount of the surface of the ground with respect to the vehicle on which the measuring apparatus is mounted, i.e., the absolute velocity of the vehicle.

In the above-described embodiments, coherent light of laser beam is irradiated on the object 30 to thereby obtain the speckle pattern. However, incoherent light may be irradiated on the object 30. In this case, images of the object 30 are obtained at the first and second irradiation timings t$_1$ and t$_2$ (which will be referred to as "first and second images", hereinafter), and are recorded in the first FLC-SLM 7. The He—Ne laser beam is modulated in the FLC-SLM 7 where the first and second images are recorded, so that the image of Young's interference fringes are formed to be recorded in the second FLC-SLM 13. The He—Ne laser beam is modulated in the FLC-SLM 13 where the image of Young's interference fringes is recorded, so that the autocorrelation signal spot image indicative of the autocorrelation between the first and second images is formed to be detected by the PSD 16.

In the above-described embodiments, there is employed a position sensitive light detector 16 for detecting one dimensional position of a light intensity peak point of a spot image received therein. However, it is possible to employ such a position sensitive light detector for detecting two dimensional position of a light intensity peak point of a spot image received therein. In the case where such a PSD as detecting two dimensional position is employed, it is possible to not only detect the displacement amount of the object but also detect the displacement direction of the object. This is because the direction along which the autocorrelation signal spot image ((+1)-th diffraction spot image) is shifted from the 0-th diffraction spot image (the X direction in the above-described embodiments) extends parallel to the direction V along which the object 30 is moved, as described already.

Each of the measuring apparatuses of the above-described embodiments is provided with the PSD 16, in order to directly detect the position of the intensity peak point of the autocorrelation signal spot image. However, the measuring apparatus of the present invention may be employed with various types of devices capable of directly detecting the position of the intensity peak point of the autocorrelation signal spot image.

In the above-described embodiments, the moving amount and the moving velocity of the moving object is detected. However, the measuring apparatus of the present invention may further detect the moving direction in which the object is moved, as described already. In addition, the measuring apparatus of the present invention may detect a changing state of an object which is being deformed or changed in its shape or figure. More specifically to say, the measuring apparatus of the present invention may detect a changing amount, a changing speed and a changing direction of the shape-changing object.

In place of the first FLC-SLM 7, various kinds of means may be employed for recording the first and second speckle patterns. For example, various types of spatial light modulators which can memorize the first speckle patterns from the first irradiation timing t$_1$ until when the second irradiating timing t$_2$ to thereby memorize both the first and second speckle patterns. Similarly, in place of the second FLC-SLM 13, various kinds of means may be employed for recording the image of Young's interference fringes. For example, various types of spatial light modulators which can memorize the image of Young's interference fringes can be employed.

In the above-described embodiments, the laser beam is irradiated on the object 30 so that the laser beam may be reflected thereat for forming therein the speckle patterns. However, in accordance with the kinds of the object 30, the laser beam may be irradiated on the object 30 so that the laser beam may be transmitted therethrough for forming therein the speckle patterns.

In the case where the light intensity of the speckle patterns obtained in the laser beam reflected from the object 30 is small, a well-known image intensifier is provided between the imaging lens 5 and the first FLC-SLM 7 so that the speckle patterns with their intensities having been increased with the image intensifier may be formed on the write side 7S$_w$ of the FLC-SLM 7.

As apparent from the above, according to the optical displacement measuring apparatus of the present invention, since the position of the intensity peak point of the autocorrelation signal spot image is detected directly with the peak point detecting means such as the PSD, it is possible to detect the intensity peak point for the short period of time. Accordingly, the optical displacement measuring apparatus of the present invention can realize a real-time measurement operation, and can measure how the velocity of the object is changed, with a short time interval.

In addition, in the measuring apparatus of the present invention, since the irradiation time interval $\Delta t$ defined between the two timings t$_1$ and t$_2$ is controlled, it is possible to achieve a high accuracy measuring operation, irrespective of the velocity of the object. Accordingly, the measuring apparatus of the present invention attains a high accuracy measuring operation with an increased dynamic range.

We claim:

1. An optical displacement measuring apparatus for optically measuring a displacement amount of an object, comprising:
   image forming means for forming at least a first image indicative of a position of an object at a first time instant and a second image indicative of a position of the object at a second time instant;
   first modulating means for receiving at least the first and second images and for modulating coherent light in accordance with the first and second images, a relative position between the first image and the second image representing a displacement amount of the object achieved between the first time instant and the second time instant;

first Fourier transform means for subjecting the coherent light modulated by said first modulating means to Fourier transformation to thereby form a first Fourier image;

second modulating means for receiving the first Fourier image and for modulating coherent light in accordance with the first Fourier image;

second Fourier transform means for subjecting the coherent light modulated by said second modulating means to Fourier transformation to thereby form a second Fourier image;

detecting means for detecting a position of the second Fourier image which is indicative of the displacement amount of the object attained between the first and second time instants, said detecting means including a position sensitive light detector for receiving the second Fourier image and for directly detecting the position of the second Fourier image; and time interval adjusting means for adjusting a time interval defined between the first and second time instants, said time interval adjusting means adjusting the value of the time interval so as to cause the second Fourier image to be received by the position sensitive light detector.

2. The optical displacement measuring apparatus as claimed in claim 1, wherein the position sensitive light detector has a detecting area for receiving the second Fourier image and for directly detecting a position of an intensity peak of the second Fourier image incident thereon which is indicative of the displacement amount of the object attained between the first and second time instants, the position sensitive light detector producing a signal indicative of the intensity peak position of the second Fourier image, said time interval adjusting means adjusting the value of the time interval so as to cause the second Fourier image to be incident on the detecting area of the position sensitive light detector.

3. The optical displacement measuring apparatus as claimed in claim 2, further comprising control means for controlling said image forming means to repeatedly form the first and second images at a plurality of sets of first and second time instants and for controlling said first modulating means to repeatedly record the thus repeatedly formed first and second images, to thereby allow said first Fourier transform means to repeatedly form the first Fourier image and allow said second Fourier transform means to repeatedly form the second Fourier image, the position sensitive light detector repeatedly detecting the thus repeatedly formed second Fourier image and producing a series of signals which indicate a time-dependent change in the position of the intensity peak of the second Fourier image so as to measure variance in the displacement amount of the object.

4. The optical displacement measuring apparatus as claimed in claim 2, further comprising calculation means for receiving the signal produced by the position sensitive light detector and for calculating a value of the displacement amount of the object attained between the first and second time instants.

5. The optical displacement measuring apparatus as claimed in claim 4, wherein said calculation means further calculates a value of velocity of the object by dividing the value of the displacement amount by the value of the time interval between the first and second time instants.

6. The optical displacement measuring apparatus as claimed in claim 3, wherein said time interval adjusting means adjusts a time interval defined between the first time instant and the second time instant of each set of the first and second time instants to have a value causing the second Fourier image formed for each set of first and second time instants to be incident on the detecting area of the position sensitive light detector.

7. The optical displacement measuring apparatus as claimed in claim 6, further comprising first Fourier image detecting means for detecting the first Fourier image repeatedly formed by said first Fourier transform means, said first Fourier image detecting means producing a series of signals which indicate a time-dependent change in the first Fourier image, wherein said time interval adjusting means includes feedback adjusting means for adjusting a time interval between a first and a second time instant of each of the sets of first and second time instants, based on at least one signal produced by said first Fourier image detecting means with respect to first and second images formed at a set of first and second time instants previous to each next set of first and second time instants, to thereby maintain the repeatedly formed second Fourier image to be incident on the detecting area of the position sensitive light detector.

8. The optical displacement measuring apparatus as claimed in claim 6, wherein said time interval adjusting means includes feedback adjusting means for adjusting a time interval between the first time instant and the second time instant of each of the sets of first and second time instants, based on at least one signal produced by the position sensitive light detector with respect to first and second images formed at a set of first and second time instants previous to each next set of first and second time instants, to thereby maintain the repeatedly formed second Fourier image to be incident on the detecting area of the position sensitive light detector.

9. The optical displacement measuring apparatus claimed in claim 8, wherein said image forming means continuously irradiates light onto the object to thereby continuously form the image of the object, and wherein said first modulating means includes a spatial light modulator for repeatedly recording the image of the object at first and second time instants of each set of the sets of first and second time instants, to thereby record therein first and second images of the object at the first and second time instants of the each set of the plural sets of first and second time instants and for repeatedly spatially modulating the coherent light in accordance with the first and second images thus repeatedly recorded therein.

10. The optical displacement measuring apparatus as claimed in claim 9, wherein said image forming means continuously irradiates coherent light onto the object to thereby continuously form a speckle pattern of the object, and wherein said first modulating means includes a spatial light modulator for repeatedly recording the speckle pattern of the object at the first and second time instants of each set of the plural sets of first and second time instants, to thereby repeatedly record therein the first and second speckle patterns of the object obtained at the first and second time instants of each set of the plural sets of first and second time instants and for repeatedly spatially modulating the coherent light in accordance with the first and second speckle patterns thus repeatedly recorded therein.

11. The optical displacement measuring apparatus as claimed in claim 9, wherein said feedback adjusting means includes modulator feedback control means for controlling said spatial light modulator to repeatedly record the image of the object at the first and second time instants of each set of the first and second time instants, the interval defined between the first time instants and the second time instants of each set being determined based on at least one signal produced by the position sensitive light detector with respect to first and second images obtained at a set of first and second time instants previous to each set of first and second time instants, to thereby cause the second Fourier image formed for each next set of first and second time instants to be incident on the detecting area of the position sensitive light detector.

12. The optical displacement measuring apparatus as claimed in claim 11, wherein said first modulating means includes a ferroelectric liquid crystal spatial light modulator for recording both the first and second images of the object and for spatially modulating the coherent light in accordance with the first and second images for reading out the first and second images therefrom, and wherein said second modulating means includes a ferroelectric liquid crystal spatial light modulator for recording the first Fourier image and for spatially modulating the coherent light in accordance with the first Fourier image for reading out the first Fourier image therefrom.

13. The optical displacement measuring apparatus as claimed in claim 11, wherein said first Fourier transform means forms, as the first Fourier image, an image of Young's interference fringes which is indicative of the positional relationship between the first and second images.

14. The optical displacement measuring apparatus as claimed in claim 13, wherein said second Fourier transform means forms, as the second Fourier image, an image of autocorrelation signal spot image indicative of the positional relationship between the first and second images.

15. The optical displacement measuring apparatus as claimed in claim 14, wherein said modulator feedback control means controls said spatial light modulator to repeatedly record the image of the object at the first and second time instants of each of the sets of first and second time instants, the first time instants and the second time instants of each set having such a time interval; therebetween to allow the autocorrelation signal spot image formed for each set of first and second timings to be formed on the detecting area of the position sensitive light detector.

16. The optical displacement measuring apparatus as claimed in claim 8, wherein said image forming means repeatedly irradiates light onto the object at the first and second time instants for each of a plurality of sets of first and second time instants, to thereby form first and second images of the object at the first and second time instants of each set of the plural sets of first and second time instants.

17. The optical displacement measuring apparatus as claimed in claim 16, wherein said image forming means repeatedly irradiates coherent light onto the object at the first and second time instants of each set of the plurality of sets of first and second time instants, to thereby form first and second speckle patterns of the object obtained at the first and second time instants of each set of first and second time instants.

18. The optical displacement measuring apparatus as claimed in claim 16, wherein said time interval adjusting means includes feedback control means for controlling said image forming means to repeatedly irradiate the object with the light at the first and second time instants of each set of the sets of first and second time instant, the interval defined between the first time instant and the second time instants of each set being determined dependent on at least one signal produced by the position sensitive light detector with respect to first and second images formed at a set of first and second time instants, to thereby cause the second Fourier image formed for each set of first and second time instants to be incident on the detecting area of the position sensitive light detector.

19. The optical displacement measuring apparatus as claimed in claim 18, wherein said first modulating means includes a spatial light modulator for recording both the first and second images of the object and for spatially modulating the coherent light in accordance with the first and second images so as to read out the first and second images therefrom, and wherein said second modulating means includes a spatial light modulator for recording the first Fourier image and for spatially modulating the coherent light in accordance with the first Fourier image so as to read out the first Fourier image therefrom.

20. The optical displacement measuring apparatus as claimed in claim 19, wherein said first modulating means includes a ferroelectric liquid crystal spatial light modulator for recording both the first and second images of the object and for spatially modulating the coherent light in accordance with the first and second images so as to read out the first and second images therefrom, and wherein said second modulating means includes a ferroelectric liquid crystal spatial light modulator for recording the first Fourier image and for spatially modulating the coherent light in accordance with the first Fourier image so as to read out the first Fourier image therefrom.

21. The optical displacement measuring apparatus as claimed in claim 18, wherein said first Fourier transform means forms, as the first Fourier image, an image of Young's interference fringes which is indicative of the positional relationship between the first and second images.

22. The optical displacement measuring apparatus as claimed in claim 21, wherein said second Fourier transform means forms, as the second Fourier image, an autocorrelation signal spot image having an intensity peak position which is indicative of the positional relationship between the first and second images.

23. The optical displacement measuring apparatus as claimed in claim 22, wherein said feedback control means controls said image forming means to repeatedly irradiate the object with the light at the first and second time instants of each set of the sets of first and second time instants, the first time instants and the second time instants of each set having a time interval therebetween to allow the autocorrelation signal spot image formed for each set of first and second timings to be formed on the detecting area of the position sensitive light detector.

24. An optical displacement measuring apparatus for optically measuring a relative displacement amount of an object relative to the optical displacement measuring apparatus, comprising:
- speckle pattern forming means for forming at least a first speckle pattern indicative of a relative position of the object with respect to the optical displacement measuring apparatus at a first time instant and a second speckle pattern indicative of a relative position of the object with respect to the optical displacement measuring apparatus at a second time instant
- first recording means for recording a composite image of; the first and second speckle patterns, a positional relationship between the first and second speckle patterns representing a relative displacement amount of the object attained with respect to the optical displacement measuring apparatus between the first and second time instants;
- first read-out means for reading out the composite image with coherent light;
- first Fourier transform means for subjecting the composite image to Fourier transformation to thereby form an image of Young's interference fringes which represents the relative displacement amount of the object attained with respect to the optical displacement measuring apparatus between the first and second time instants;
- second recording means for recording the image of the Young's interference fringes;
- second read-out means for reading out the image of the Young's interference fringes with coherent light;
- second Fourier transform means for subjecting the image of the Young's interference fringes to Fourier transformation to thereby form an autocorrelation signal spot image, a position of an intensity peak of the autocorrelation signal spot image representing the relative displacement amount of the object attained with respect to the optical displacement measuring apparatus between the first and second time instants;
- detecting means for detecting the position of the intensity peak of the autocorrelation signal spot image, said detecting means including a position sensitive light detector having a detecting area for receiving the autocorrelation signal spot image and for directly detecting the position of the intensity peak thereof, the position sensitive light detector outputting a signal indicative of the intensity peak position of the autocorrelation signal spot image; and
- time interval adjusting means for adjusting a time interval defined between the first and second time instants, said time interval adjusting means adjusting the time interval so that the autocorrelation signal spot image may be formed within the detecting area of the position sensitive light detector.

25. The optical displacement measuring apparatus as claimed in claim 24, further comprising control means for controlling said speckle pattern forming means to repeatedly form the first and second speckle patterns and for controlling said first recording means to repeatedly record the composite image of the first and second speckle patterns, to thereby allow said first Fourier transform means to repeatedly form the image of Young's interference fringes and allow said second Fourier transform means to repeatedly form the autocorrelation signal spot image, the position sensitive light detector repeatedly detecting the thus repeatedly formed autocorrelation signal spot image and outputting a series of signals which indicate a time-dependent change in the position of the intensity peak of the autocorrelation signal spot image so as to measure how the relative displacement amount of the object varies with respect to the optical displacement measuring apparatus.

26. The optical displacement measuring apparatus as claimed in claim 25, further comprising Young's interference fringe detecting means for detecting the image of the Young's interference fringes repeatedly formed for the repeatedly formed first and second speckle patterns and producing a series of signals which indicate a time-dependent change in the image of the Young's interference fringes,
- wherein said time interval adjusting means includes feedback adjusting means for adjusting a time interval between the first and second time instants for forming first and second speckle patterns, dependent on at least one signal outputted from said Young's interference fringe detecting means for first and second speckle patterns formed at first and second time instants previous to the next first and second time instants, to thereby maintain the repeatedly formed autocorrelation signal spot image to be incident on the detecting area of the position sensitive light detector.

27. The optical displacement measuring apparatus as claimed in claim 25, wherein said time interval adjusting means includes feedback adjusting means for adjusting a time interval between the first and second time instants for forming first and second speckle patterns, based on at least one signal outputted from the position sensitive light detector for first and second speckle patterns formed at first and second time instants previous to the next first and second time instants, to thereby maintain the repeatedly formed autocorrelation signal spot image to be incident on the detecting area of the position sensitive light detector.

28. The optical displacement measuring apparatus as claimed in claim 27, wherein said speckle pattern forming means continuously irradiates coherent light onto the object to thereby continuously form a speckle pattern of the object, said first recording means recording the speckle pattern of the object repeatedly at the first and second time instants to thereby repeatedly record the composite image of the first and second speckle patterns, and
- wherein said feedback adjusting means includes feedback control means for controlling said first recording means to repeatedly record the first and second speckle patterns at the first and second time instants, the interval defined between the first and second time instants being determined based on at least one signal outputted from the position sensitive light detector for first and second speckle patterns formed at first and second time instants previous to the next first and second time instants, to thereby maintain the repeatedly formed autocorrelation signal spot image to be incident on the detecting area of the position sensitive light detector.

29. The optical displacement measuring apparatus as claimed in claim 27, wherein said speckle pattern forming means repeatedly irradiates coherent light onto the object at the first and second time instants so as to repeatedly form the first and second speckle patterns, said first recording means repeatedly recording the composite image of the thus repeatedly formed first and second speckle patterns, and wherein said feedback adjusting means includes feedback control means for controlling said speckle pattern forming means to repeatedly irradiate the object with the light at the first and second time instants, an interval defined between the first and second time instants being determined based on at least one signal outputted from the position sensitive light detector for first and second speckle patterns formed at first and second time instants previous to the next first and second time instants, to thereby maintain the repeatedly formed autocorrelation signal spot image to be incident on the detecting area of the position sensitive light detector.

30. An optical displacement measuring apparatus for optically measuring a relative displacement state of an object relative to the optical displacement measuring apparatus, comprising:

image forming means for forming at least an optical image indicative of a relative displacement state of an object with respect to the optical displacement measuring apparatus achieved during a time duration defined between a first time instant and a second time instant;

first recording means for recording the optical image;

first read-out means for reading out the optical image with coherent light;

first Fourier transform means for subjecting the optical image to Fourier transformation to thereby form a first Fourier optical image;

second recording means for recording the first Fourier optical image;

second read-out means for reading out the first Fourier optical image with coherent light;

second Fourier transform means for subjecting the first Fourier optical image to Fourier transformation to thereby form a second Fourier optical image;

detecting means for detecting a position of an intensity peak of the second Fourier optical image indicative of the relative displacement state of the object with respect to the optical displacement measuring apparatus achieved during the time duration between the first and second time instants, said detecting means including a position sensitive light detector having a detecting area for receiving the second Fourier image and for directly detecting the intensity peak position of the second Fourier optical image incident thereon, the position sensitive light detector producing a signal indicative of the intensity peak position of the second Fourier image; and time duration adjusting means for adjusting a value of the time duration between the first and second time instants, said time duration adjusting means adjusting the value of the time duration so as to cause the second Fourier image to be formed within the detecting area of the position sensitive light detector.

31. The optical displacement measuring apparatus as claimed in claim 30, further comprising control means for controlling said image forming means to form a plurality of images, one by one, which indicate a plurality of relative displacement states of the object relative to the optical displacement measuring apparatus attained during a plurality of time durations defined respectively between plural sets of first and second time instants, to thereby allow said first Fourier transform means to form, one by one, a plurality of first Fourier images and said second Fourier transform means to form, one by one, a plurality of second Fourier images, the position sensitive light detector receiving, one by one, the plurality of second Fourier images, the intensity peak positions of the plurality of second Fourier images indicating the plurality of relative displacement states of the object attained during the respective time durations, the position sensitive light detector detecting the intensity peak positions of the plurality of second Fourier images one by one and producing a plurality of signals indicative of the respective intensity peak positions one by one, the thus produced series of signals representing how the relative displacement state of the object varies.

32. The optical displacement measuring apparatus as claimed in claim 31, further comprising first Fourier image detecting means for detecting, one by one, the plurality of first Fourier images indicative of the relative displacement states of the object during the respective time durations, said first Fourier image detecting means producing, one by one, signals, indicative of the relative displacement states of the object during the respective time durations, wherein said time duration adjusting means includes another feedback adjusting means for adjusting a value of each of the plurality of time durations, based on at least one signal previously produced by said first Fourier image detecting means, so as to cause each of the plurality of second Fourier images obtained for the plurality of time durations to be incident on the detecting area of the position sensitive light detector.

33. The optical displacement measuring apparatus as claimed in claim 31, wherein said time duration adjusting means includes feedback adjusting means for adjusting a value of each of the plurality of time durations, based at least one signal previously produced by the position sensitive light detector, so as to cause each of the plurality of second Fourier images obtained for the plurality of time durations to be incident on the detecting area of the position sensitive light detector.

34. The optical displacement measuring apparatus as claimed in claim 33, wherein said image forming means continuously irradiates light onto the object to thereby continuously form the image of the object, and wherein said first recording means records the image of the object only at each of the first time instants and each of the second time instants, to thereby record therein a composite image of a first image of the object obtained at each first time instant and a second image of the object obtained at each second time instant, the positional relationship between the first and second images representing the relative displacement state of the object with respect to the optical displacement measuring apparatus attained during the time duration between the corresponding first and second time instants, and wherein said feedback adjusting means includes another feedback control means for controlling said first recording means to record the image of the object at each of the plurality of first time instants and each of the plurality of second time instants with a time interval defined therebetween having a value determined based on at least one signal previously produced by the position sensitive light detector so as to cause each of the plurality of second Fourier images to be incident on the detecting area of the position sensitive light detector.

35. The optical displacement measuring apparatus as claimed in claim 32, wherein said image forming means irradiates light onto the object at each of the plurality of first timings and at each of the plurality of second timings, to thereby form a first image of the object obtained at each of the first time instants and a second image of the object obtained at each of the second time instants, said first recording means recording a composite image of the first and second images, the positional relationship between the first and second images representing the relative displacement state of the object with respect to the optical displacement measuring apparatus attained during the time duration between the corresponding first and second time instants, and wherein said feedback adjusting means includes feedback control means for controlling said image forming means to irradiate the object with the light at each of the plurality of first time instants and each of the plurality of second time instants with a time interval defined therebetween having a value determined based on at least one signal previously produced by the position sensitive light detector so as to cause each of the plurality of second Fourier images to be incident on the detecting area of the position sensitive light detector.

* * * * *